United States Patent
Matsubara et al.

(10) Patent No.: US 6,617,703 B2
(45) Date of Patent: Sep. 9, 2003

(54) AUXILIARY DRIVE AND AUTOMOBILE EQUIPPED WITH THE SAME

(75) Inventors: Kenichiro Matsubara, Chiyoda (JP); Yuzo Kadomukai, Ishioka (JP); Toshiyuki Innami, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/985,306

(22) Filed: Nov. 2, 2001

(65) Prior Publication Data
US 2003/0042054 A1 Mar. 6, 2003

(30) Foreign Application Priority Data
Sep. 5, 2001 (JP) ........................................ 2001-268204

(51) Int. Cl.⁷ ............................................... H02P 9/04
(52) U.S. Cl. .................................. 290/40 C; 180/65.2
(58) Field of Search ............................. 290/40 A, 40 C; 180/65.2, 65.4

(56) References Cited

U.S. PATENT DOCUMENTS

| | | | | |
|---|---|---|---|---|
| 5,433,512 A | * | 7/1995 | Aoki et al. ...................... 303/3 |
| 5,654,887 A | * | 8/1997 | Asa et al. ...................... 701/22 |
| 6,155,365 A | * | 12/2000 | Boberg ...................... 180/65.2 |
| 6,283,239 B1 | * | 9/2001 | Tsukamoto et al. ......... 180/65.2 |
| 6,334,079 B1 | * | 12/2001 | Matsubara et al. .......... 701/22 |
| 6,370,470 B1 | * | 4/2002 | Yamamura et al. .......... 701/96 |
| 6,424,053 B1 | * | 7/2002 | Wakashiro et al. ....... 290/40 C |
| 6,528,959 B2 | * | 3/2003 | Kitano et al. .................. 318/55 |
| 2002/0007974 A1 | * | 1/2002 | Nagano et al. ............ 180/65.2 |
| 2002/0041167 A1 | * | 4/2002 | Kitano et al. .................. 318/3 |
| 2002/0063000 A1 | * | 5/2002 | Kojima ...................... 180/65.1 |

FOREIGN PATENT DOCUMENTS

JP 9-9414 1/1997 ........... B60L/11/14

OTHER PUBLICATIONS

Patent Abstracts of Japan 09–009414 Jan. 10, 1997.

* cited by examiner

Primary Examiner—Nicholas Ponomarenko
(74) Attorney, Agent, or Firm—Antonelli, Terry, Stout & Kraus, LLP

(57) ABSTRACT

There are included a first motor-generator; speed change device disposed between an engine and a first wheel drive shaft; demanded braking force detection device for detecting braking force demanded by the driver; engine braking force calculation device for calculating engine braking force; and regenerative braking force calculation device for calculating regenerative braking force resulted by regenerative power generation of the first motor-generator. Gear ratio or shift points of the speed change device is controlled on the basis of information from the demanded braking force detection device, the engine braking force calculation device and the regenerative braking force calculation device.

11 Claims, 17 Drawing Sheets

FIG. 2

| OPERATION MODE | OPERATING STATE | | | DRIVE CONDITION CONTROL ITEMS | | | | | | |
|---|---|---|---|---|---|---|---|---|---|---|
| | DRIVING STATE | 1ST MG | 2ND MG | CONTROL OF SPEED CHANGE MEANS | CONTROL OF BRAKING FORCE | CONTROL OF CHARGING AMOUNT | DISTRIBUTION CONTROL OF GENERATOR TORQUE | CONTROL OF DRIVING FORCE | CONTROL OF ENGINE | DISTRIBUTION CONTROL OF MOTOR TORQUE |
| 1A | CONSTANT-SPEED (ACCELERATION) | REGENERATION | FREE | ○ | ○ | ○ | — | — | — | — |
| 1B | DECELERATION ~ (STOP) | FREE | REGENERATION | — | ○ | ○ | — | — | — | — |
| 1C | | REGENERATION | REGENERATION | ○ | ○ | ○ | ○ | — | — | — |
| 2A | START | MOTOR | FREE | ○ | — | ○ | — | ○ | ○ | — |
| 2B | | FREE | MOTOR | ○ | — | — | — | ○ | ○ | — |
| 2C | ACCELERATION | MOTOR | MOTOR | ○ | — | — | — | ○ | ○ | ○ |
| 2D | (CONSTANT-SPEED) | GENERATOR | FREE | ○ | — | — | — | — | ○ | — |
| 2E | | GENERATOR | MOTOR | ○ | — | — | — | — | ○ | — |

FIG. 13
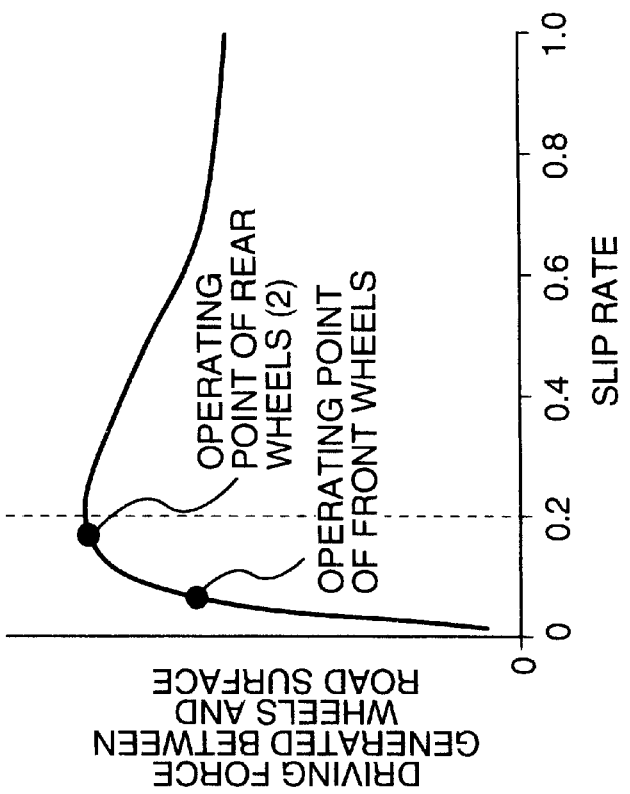
(a) A CASE IN WHICH 2ND MG IS NOT OPERATED AS MOTOR
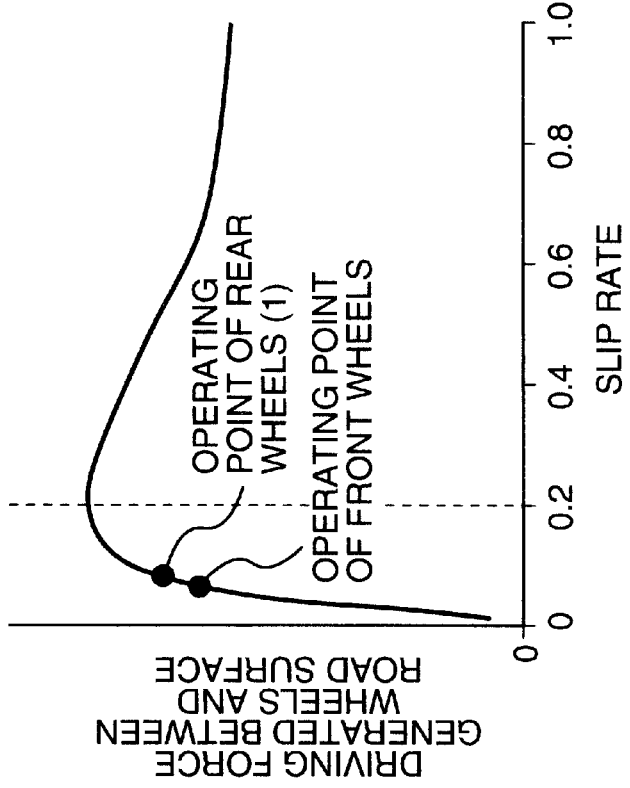
(b) A CASE IN WHICH 2ND MG IS OPERATED AS MOTOR

FIG. 14
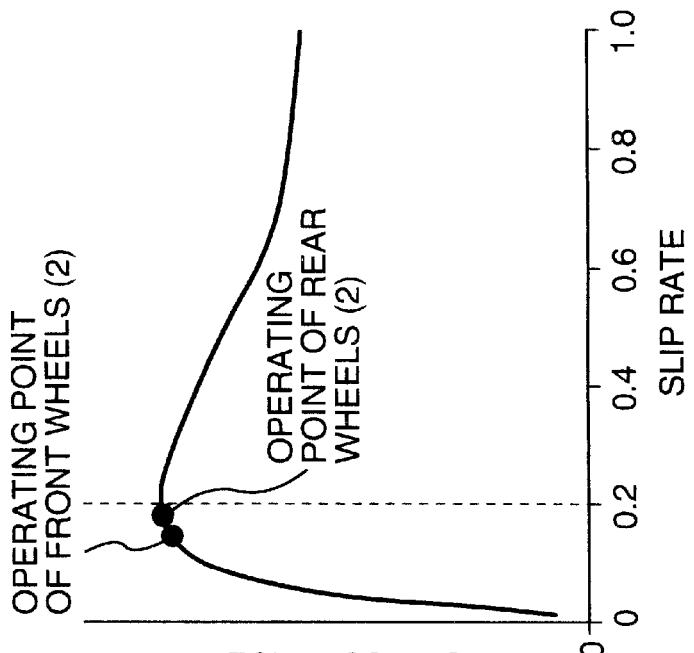
(b) A CASE IN WHICH 1ST MG IS OPERATED AS GENERATOR AND 2ND MG IS OPERATED AS MOTOR
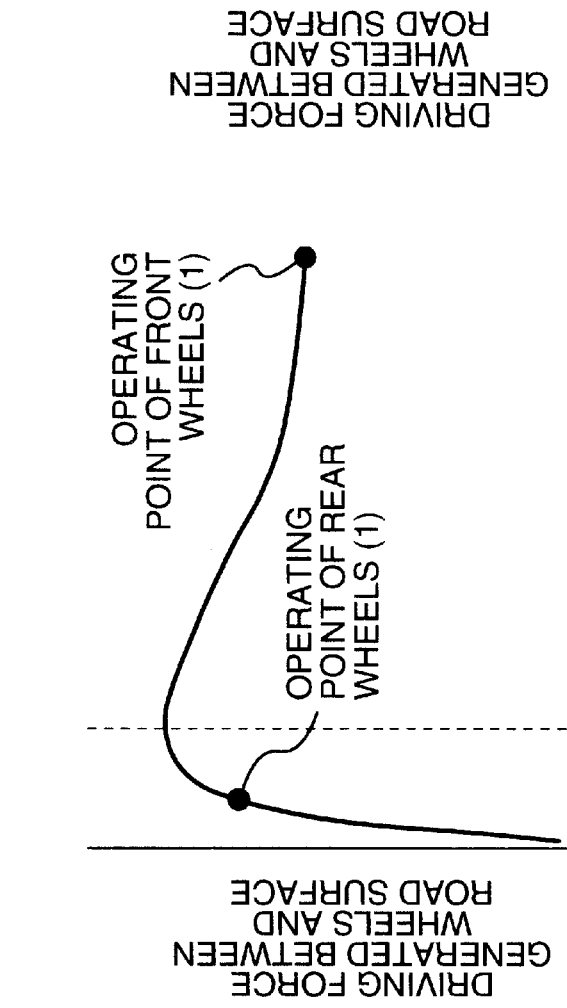
(a) A CASE IN WHICH 1ST MG IS NOT OPERATED AS GENERATOR AND 2ND MG IS NOT OPERATED AS MOTOR

AUXILIARY DRIVE AND AUTOMOBILE EQUIPPED WITH THE SAME

BACKGROUND OF THE INVENTION

The present invention relates to an auxiliary drive and an automobile equipped with the same.

As disclosed in JP-A-9-9414 specification, conventional automobiles equipped with an auxiliary drive, for example, hybrid automobiles have an engine and a motor, and transmit power from at least one of them to an output shaft, and change speed through a multi-speed automatic transmission disposed between the engine and the output shaft. The conventional hybrid automobile comprises an electric power source that provides electric power to the motor and receives regenerative power returned from the motor which acts as a generator, and remaining-amount detection means for detecting remaining electric power capacity of the electric power source. In the convention hybrid automobiles, a shift point which determines steps of the multi-speed automatic transmission is moved in a direction to increase range of low speed in accordance with degree of decrement of the remaining electric power capacity detected by the remaining-amount detection means.

In the above-described specification, there is description that it is possible to increase the rotation of the engine as a whole to increase the regenerative electric power of the motor acting as a generator. However, since according to the above-described prior art, movement of the shift points which determine steps of the multi-speed automatic transmission is depending on degree of decrement of the remaining electric power capacity, there is possibility that a shift to a lower gear may be made during deceleration running. In such a case, the rotational speed of the engine increases to result in increased friction torque, and therefore, there is possibility that engine braking force in excess of braking force demanded by a driver occurs.

In a structure in which a motor is placed on an output side of an engine, a multi-speed automatic transmission equipped with a torque converter is placed subsequent to the motor, and an output shaft is placed subsequent to the multi-speed automatic transmission, if the above-described unexpected shift to a lower gear is made during deceleration running, rotational speed of the torque converter increases on the side of the multi-speed automatic transmission, increasing engine braking force temporarily. Therefore, there is possibility that a driver feels a shock depending on running state.

Furthermore, at the time of moving shift points which determine steps of the multi-speed automatic transmission, it is necessary to move the shift points of both up-shift (speed change decreasing the gear ratio) and down-shift (speed change increasing the gear ratio). This makes the timing of an up-shift during accelerated running in dependant on degree of decrement in remaining power capacity, which may cause the driver to experience an uncomfortable feeling of changing speed.

The above-described circumstances are not desirable for the operability of automobiles and the amenity.

SUMMARY OF THE INVENTION

The present invention has been achieved to solve at least one of the above problems. An object of the invention is to provide an auxiliary drive which can be retrofitted to existing automobiles easily and can improve the operability, comfortableness, and fuel economy of the automobiles as well as to provide an automobile equipped with the auxiliary drive.

To attain the above object, an auxiliary drive and an automobile equipped with the auxiliary drive according to the present invention comprise a rotating electric machine connected to an engine and functioning at least as a generator, speed change means disposed between the engine and a wheel axle and means for controlling gear ratio or shift points of the speed change means.

More preferably, the auxiliary drive and the automobile equipped with the auxiliary drive according to the present invention comprise a rotating electric machine connected to an engine and functioning at least as a generator, speed change means disposed between the engine and a wheel axle, demanded braking force detection means for detecting braking force demanded by a driver, engine braking force calculation means for calculating engine braking force and regenerative braking force calculation means for calculating regenerative braking force produced by regenerative power generation of the rotating electric machine, wherein gear ratio or shift point of the speed change means is controlled based on information from the demanded braking force detection means, the engine braking force calculation means and the regenerative braking force calculation means.

According to the above-described structure, it is possible to efficiently recover the automobile's kinetic energy resulting from deceleration, i.e., deceleration energy, and use the recovered deceleration energy for operating the rotating electric machine as a motor, and thereby improve the operability, comfortableness, safety, and even fuel economy of the automobile.

BRIEF DESCRIPTION OF THE DRAWINGS

FIG. 2 is a view showing operation modes of first and second motor-generators.

FIG. 13 is views showing an example of a relationship between slip rate and driving force produced between wheels and a road surface.

FIG. 14 is a views showing an example of a relationship between slip rate and driving force produced between wheels and a road surface.

DESCRIPTION OF PREFERRED EMBODIMENT OF THE INVENTION

An embodiment of the present invention will be described hereinafter with reference to the drawings.

Figure 1:
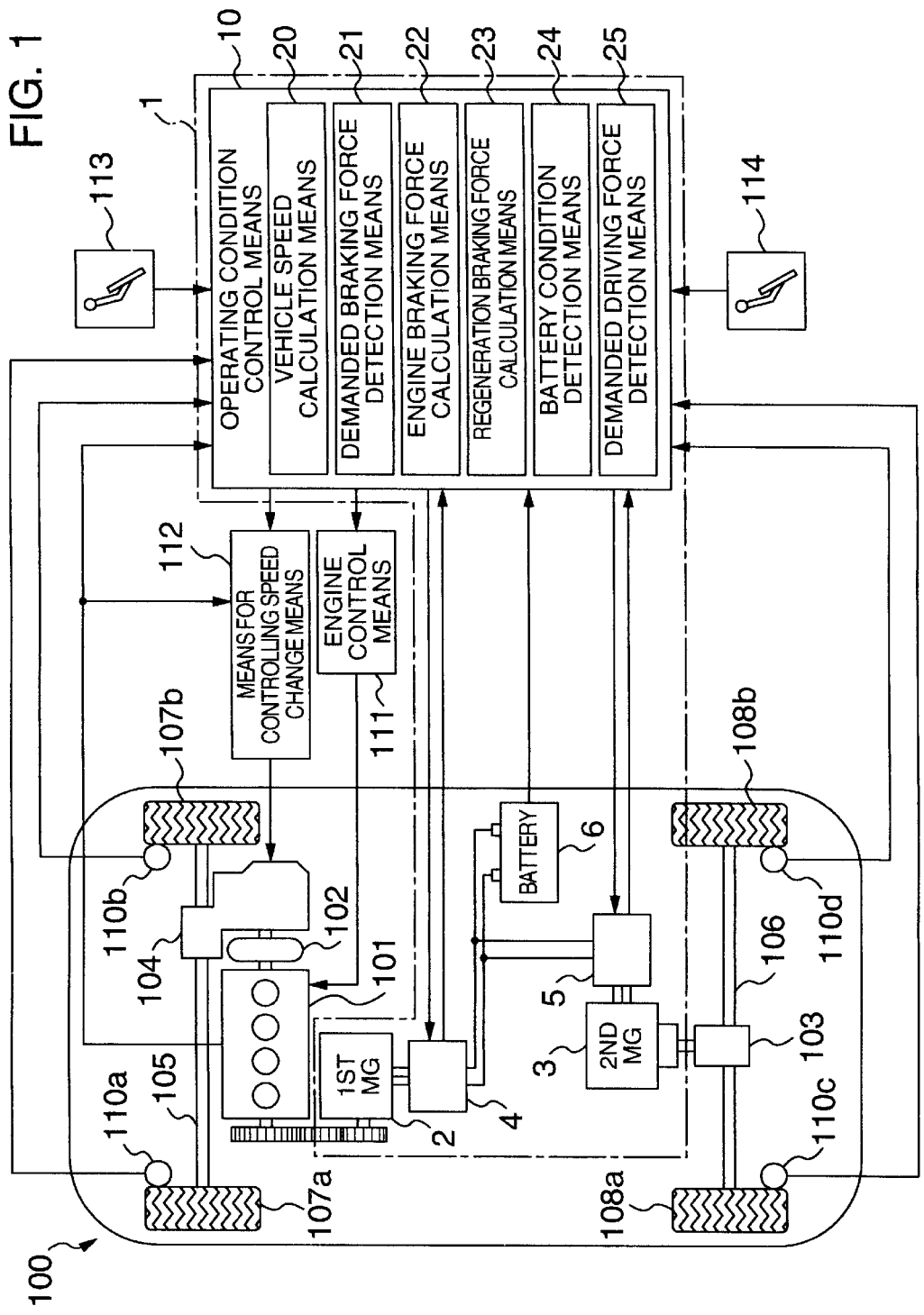
FIG. 1 is an overall structural diagram of an auxiliary drive and an automobile equipped with the auxiliary drive according to an embodiment of the present invention.

FIG. 1 shows an overall structure of an auxiliary drive 1 and automobile 100 equipped with the auxiliary drive 1 according to the embodiment of the present invention.

In FIG. 1, the auxiliary drive 1 comprises a first motor-generator (hereinafter referred to as a first MG) 2 connected to an engine 101, for example, via a belt, chain, or the like; a first inverter 4 which converts DC power of a battery 6 into AC power to output to the first MG 2 and converts AC power generated in the first MG 2 into DC power to output to the battery 6; a second motor-generator (hereinafter referred to as a second MG) 3 connected to a second wheel drive shaft 106; a second inverter 5 which converts DC power of the battery 6 into AC power to output to the second MG 3 and converts AC power generated in the second MG 3 into DC power to output to the battery 6; the battery 6 which transfers DC power between the first and second inverters 4 and 5; and operating condition control means 10 for controlling operating conditions of the first MG 2 and the second MG 3.

The operating condition control means 10 comprises vehicle speed calculation means 20 for calculating vehicle speed of the automobile 100 based on wheel speed of driven wheels (rear wheels 108a and 108b in FIG. 1); demanded braking force detection means 21 for detecting ON/OFF state of a brake pedal 113 and braking force demanded by the driver; engine braking force calculation means 22 for calculating engine braking force acting on the automobile 100; regenerative braking force calculation means 23 for calculating regenerative braking force, i.e., the braking force acting on the automobile 100 due to operation of the first MG 2 and the second MG 3 as generators (regeneration); battery condition detection means 24 for detecting charging rate, etc. of the battery 6; and demanded driving force detection means 25 for detecting ON/OFF state of an accelerator pedal 114 and driving force demanded by the driver.

Wheel speed detection means 110a, 110b, 110c, and 110d comprise, for example, rotational speed sensors. The vehicle speed calculation means 20 comprises arithmetic circuitry or arithmetic processing for calculating the vehicle speed of the automobile 100, on the basis of information from the wheel speed detection means 110a, 110b, 110c, and 110d as well as wheel radius of front wheels 107a and 107b or rear wheels 108a and 108b, etc. The demanded braking force detection means 21 comprises arithmetic circuitry or arithmetic processing for calculating the braking force demanded by the driver using, for example proportionality, on the basis of stroke of the brake pedal 113, pedal pressure, or the like. The engine braking force calculation means 22 comprises arithmetic circuitry or arithmetic processing for calculating the engine braking force acting on the automobile 100, on the basis of the rotational speed of the engine 101, etc. The regenerative braking force calculation means 23 comprises arithmetic circuitry or arithmetic processing for calculating the regenerative braking force acting on the automobile 100, on the basis of generator torque of the first MG 2, rotational speed of the engine 101, etc. The battery condition detection means 24 comprises arithmetic circuitry or arithmetic processing for calculating charging rate of the battery 6, on the basis of charge current charged into the battery 6 and discharge current discharged from the battery 6, terminal voltage of the battery 6 during charging and discharging and temperature, etc. The demanded driving force detection means 25 comprises arithmetic circuitry or arithmetic processing for detecting the driving force demanded by the driver using, for example, proportionality, on the basis of stroke of the accelerator pedal 114, etc.

In FIG. 1, the automobile 100 comprises the engine 101 which generates rotational driving force by burning fossil fuel or the like; a first wheel drive shaft 105; the second wheel drive shaft 106; the front wheels 107a and 107b; the rear wheels 108a and 108b; first driving force transmitting means 102 and speed change means 104 which convert the rotational driving force of the engine 101 and the first MG 2 to transmit to the first wheel drive shaft 105 as well as convert the rotational driving force of the first wheel drive shaft 105 to transmit to the engine 101 and the first MG 2; second driving force transmitting means 103 which convert the rotational driving force of the second MG 3 to transmit to the second wheel drive shaft 106 as well as convert the rotational driving force of the second wheel drive shaft 106 to transmit to the second MG 3; the wheel speed detection means 110a, 110b, 110c, and 110d for detecting the wheel speed of the front wheels 107a and 107b and the rear wheels 108a and 108b; engine control means 111 for controlling the engine 101; and control means 112 for the speed change means for controlling the speed change means 104.

The first driving force transmitting means 102 (or driving force transmission device), which mainly plays the role of starting the automobile 100 smoothly, comprises, for example, a torque converter, an electromagnetic clutch, a hydraulic clutch, or the like. The speed change means 104 (or transmission), which plays the role of changing the rotational driving force of the engine 101 appropriately according to the driving state of the automobile 100, comprises, for example, a multi-speed automatic transmission, continuously variable automatic transmission, or the like. In the present invention, any one of the above-mentioned first driving force transmitting means 102 and any one of the above-mentioned speed change means 104 can be used in combination and the same advantages can be afforded with respect to any one of combination.

The engine 101, the first MG 2, and the second MG 3 are not necessarily be arranged as shown in FIG. 1. For example, a structure may be employed in which the engine 101 and the first MG 2 drive the second wheel drive shaft 106 while the second MG 3 drives the first wheel drive shaft 105.

FIG. 2 shows operation modes of the first MG 2 and the second MG 3 according to the embodiment of the present invention. In the drawing, the driving states of the automobile 100 to which the operation modes are applied are listed under "Driving state", operating statuses of the first MG 2 and the second MG 3 are listed under "Operating status", and various types of control performed in operating condition control of the first MG 2 and the second MG 3 are listed under "Operating condition control items".

Incidentally, in the drawing, "regeneration" indicates a state in which the first MG 2 or the second MG 3 is operating as a generator by receiving rotational driving force of the first or second wheel drive shaft 105 or 106, "generator" indicates a state in which the first MG 2 is operating as a generator by receiving rotational driving force of the engine, "motor" indicates a state in which the first MG 2 or the second MG 3 is operating as a motor using the electric energy stored in the battery 6 as a power source, and "free" indicates a state in which neither motoring operation nor generating operation is performed.

The circles in the "Drive condition control items" indicate that the given control is effected.

Figure 3:
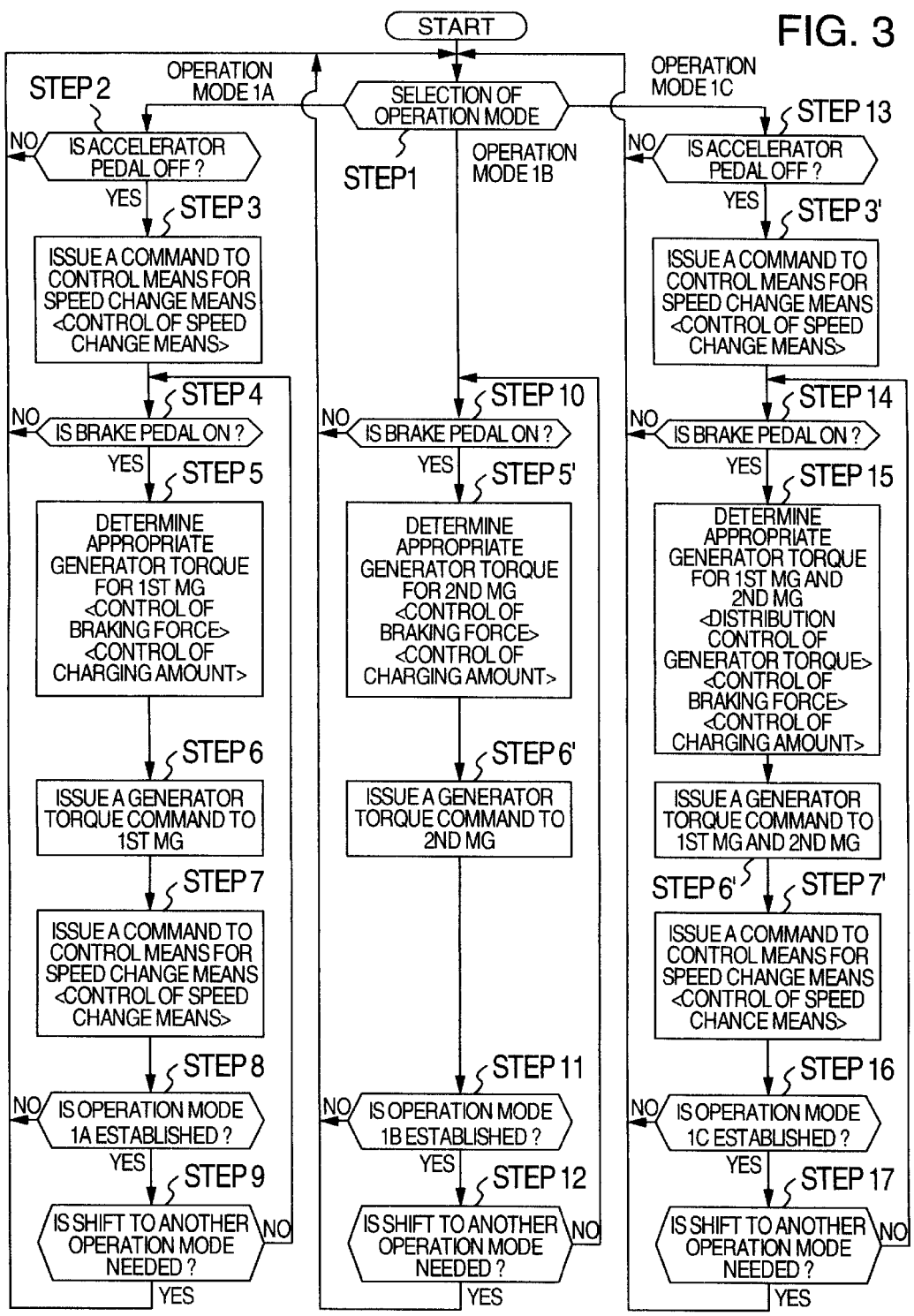
FIG. 3 is a view showing a control flow of operating condition control means.
Figure 11:
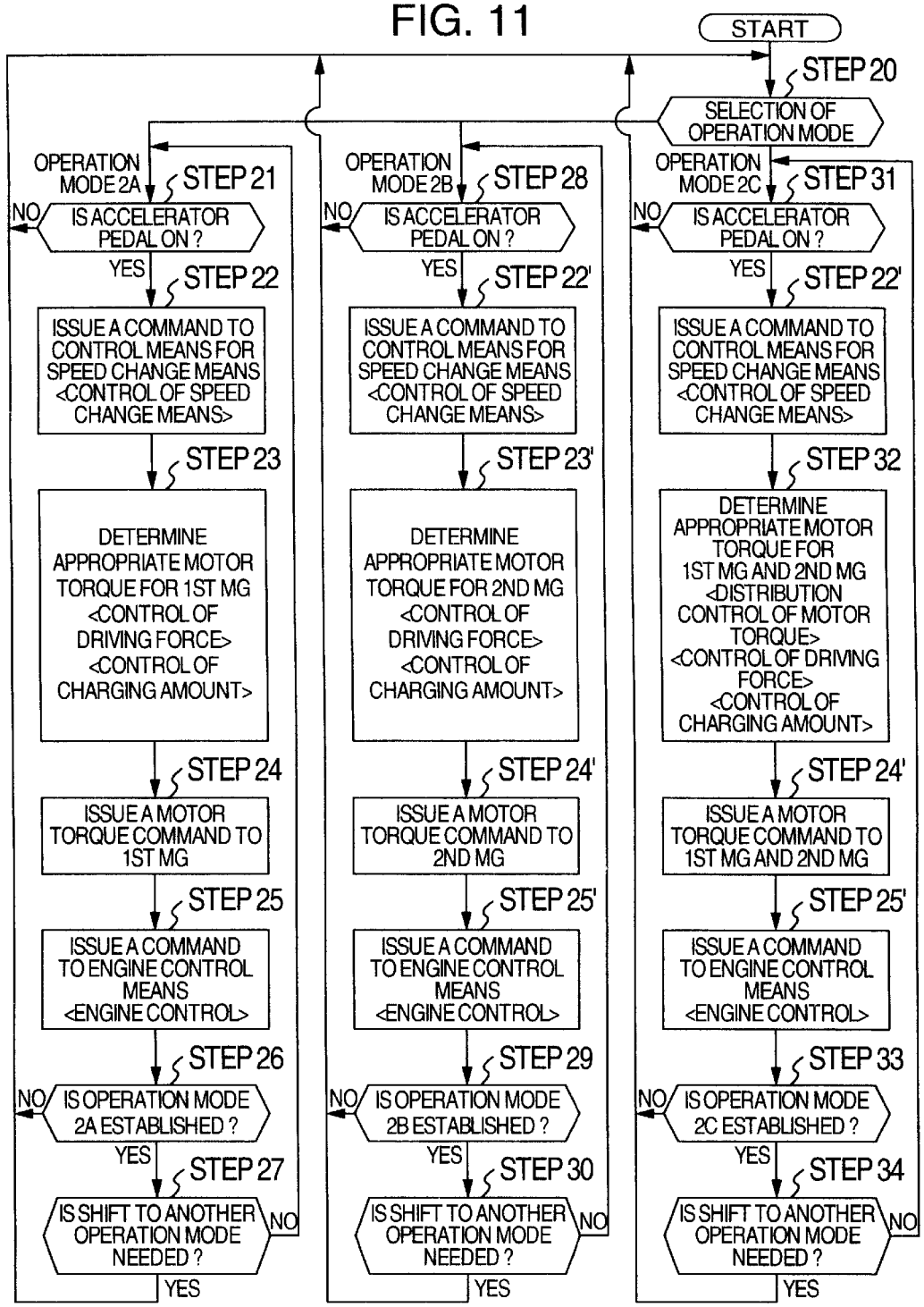
FIG. 11 is a view showing a control flow of operating condition control means.
Figure 12:
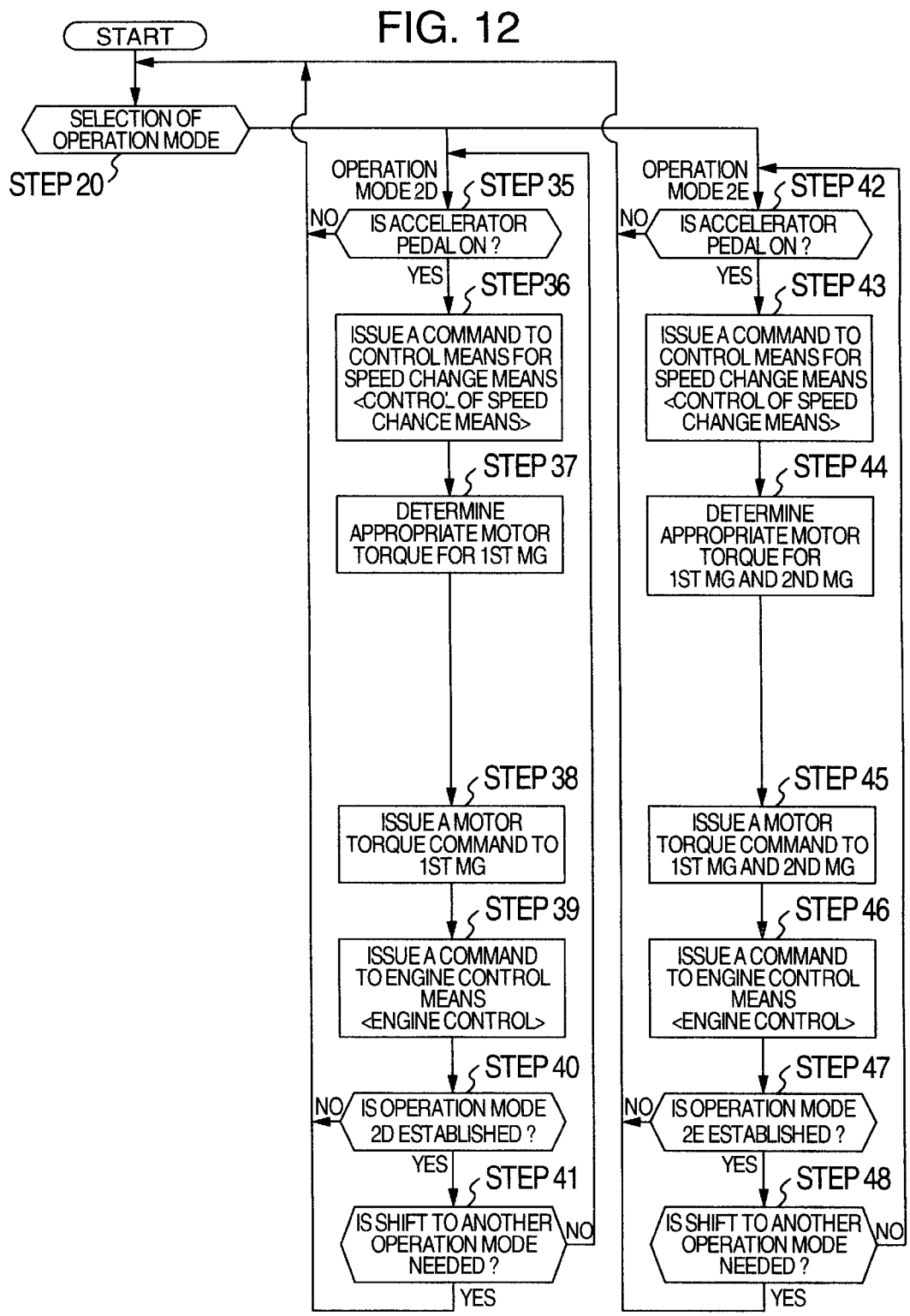
FIG. 12 is a view showing a control flow of operating condition control means.

Now, with reference to control flows in FIGS. 3, 11, and 12, description will be given hereinafter about the operating condition control and processing performed by the operating condition control means 10 by operating the first MG 2 and the second MG 3 to improve the operability, comfortableness, and fuel economy of the automobile 100. FIG. 3 shows selection of operation modes 1A, 1B and 1C and FIG. 11 shows selection of operation modes 2A, 2B and 2C, and FIG. 12 shows selection of operation modes 2D and 2E. "START" in the drawings means a start of the automobile 100.

First, description will be given about a case in which the automobile 100 shifts from constant-speed running or acceleration running to deceleration running and continues deceleration running. In this case, the first MG 2 and the second MG 3 are operated in accordance with any one of the operation modes 1A, 1B and 1C and kinetic energy of the automobile 100 resulted from deceleration (hereinafter referred as deceleration energy) is efficiently recovered.

Step 1 will be described hereinafter.

At the same time when the automobile 100 starts, the operating condition control means 10 selects an optimum operation mode, on the basis of information, such as the terminal voltage and charging rate of the battery 6 obtained from the battery condition detection means 24; information obtained from the demanded braking force detection means 21 and the demanded driving force detection means 25; information, such as cooling water temperature, intake and exhaust temperature, and combustion condition, obtained from the engine 101; motor characteristics (torque characteristics, motor efficiency and the like) and generator characteristics (generator output, generator efficiency and the like) of the first MG 2 and the second MG 3.

At the time of selecting an operation mode, it is possible to take into consideration the driver's request to recover deceleration energy detected by deceleration energy recovery request detection means (not shown) of the automobile 100.

Now, an example of operation mode selection in Step 1 will be described hereinafter.

At the time of running on a slippery road for example (hereinafter referred as a low-coefficient of friction road) such as a wet road, snowy road, or frozen road or the like operation mode 1C is selected because it is desirable to operate the first MG 2 and the second MG 3 as generators (regeneration) simultaneously not so as to destroy braking balance. The road conditions are inferred from a slip rate obtained from the vehicle speed and the wheel speed.

If the charging rate of the battery 6 hovers near the upper or lower limit of a prescribed range, the operation mode 1C is selected because it is desirable to use generator torque distribution control described later.

The above is an example of operation mode selection in Step 1. However, this is not restrictive. An optimum operation mode is selected on the basis of the various information described above Now, description will be given hereinafter about a case in which the operation mode 1A is selected in Step 1, i.e., the operating status of the first MG 2 is regeneration and the operating status of the second MG 3 is free.

Step 2 will be described hereinafter.

The operating condition control means 10 detects ON/OFF state of the accelerator pedal 114, and when the accelerator pedal 114 enters an OFF state, the step is moved to Step 3. If the accelerator pedal 114 is in the ON state, the step is moved to Step 1 and selection of operation mode is continued.

Step 3 will be described hereinafter.

During running, the control means 112 for the speed change means selects a gear ratio of the speed change means 104 on the basis of opening degree of a throttle (not shown) located near the engine 101, vehicle speed, and other information and with reference to a speed diagram or the like (not shown), and issues a speed change command for up-shift (speed change decreasing the gear ratio) and down-shift (speed change increasing the gear ratio) to the speed change means 104. In response to the speed change command, the speed change means 104 effects either of the above-mentioned gear changes.

At the time of shifting from constant-speed running or acceleration running to deceleration running in the absence of operating condition control, as the accelerator pedal 114 shifts from the ON state to the OFF state, causing the throttle to change from an open state to a closed state (hereinafter referred as a shift to a full closed state), the control means 112 for the speed change means may output an up-shift command to the speed change means 104 in accordance with the above description. In response to this speed change command, the speed change means 104 performs gear change of the up-shift.

However, in a case in which the operating condition control based on the operation mode 1A is effected, the operating condition control means 10 issues to the control means 112 for the speed change means a command not to output a speed change instruction to the speed change means 104 on the basis of speed change means control and to output a speed change instruction to properly determine gear ratio of the speed change means 104 to the speed change means 104. With this, the speed change means 104 performs gear change to the gear ratio determined by the operating condition control means 10.

Now, an example of method to determine gear ratio of the speed change means 104 in Step 3 will be described hereinafter.

The engine braking force acting on the automobile 100 is calculated by the engine braking force calculation means 22 on the basis of Equation (1), for example.

$$FE = (TF \times iG \times iF)/rW \quad \ldots \text{Equation (1)}$$

where FE is the engine braking force, TF is friction torque of the engine 101, iG is the gear ratio of the speed change means 104, iF is the reduction gear ratio of a final reduction gear (not shown), and rW is an effective radius of the front wheels 107a and 107b. Regarding the friction torque TF of the engine 101, values grasped in advance may be retained as a map.

The operating condition control means 10 estimates changes in the gear ratio of the speed change means 104 and changes in the friction torque of the engine 101, resulting from speed changes, extracts a gear ratio which maximizes the rotational speed of the engine without causing the engine braking force calculated, for example, according to Equation (1) to exceed a predetermined braking force and without causing overspeed, and then based on this, determines a value of gear ratio which can be actually adopted by the speed change means 104.

The predetermined braking force comprises a braking force which does not degrade ride quality.

This is, for example, force which results deceleration of (0.1×gravitational acceleration) on the automobile 100. However, with regard to predetermined braking force, an optimum value may be set in accordance with the structure of the automobile 100.

The gear ratio determined above is output as a speed change command to the speed change means 104, which then performs gear change. However, if the speed change means 104 is a multi-speed automatic transmission, the gear ratio used before entering deceleration running may be maintained in some cases because the multi-speed automatic transmission has a limited number of speeds.

In addition, it is possible to adjust the opening degree of the throttle (not shown) as well as the valve timing or the like of intake and exhaust valves (not shown) installed in the engine 101 in order to reduce the friction torque of the engine 101. With this, it is possible to further increase the rotational speed of the engine 101.

Figure 4:
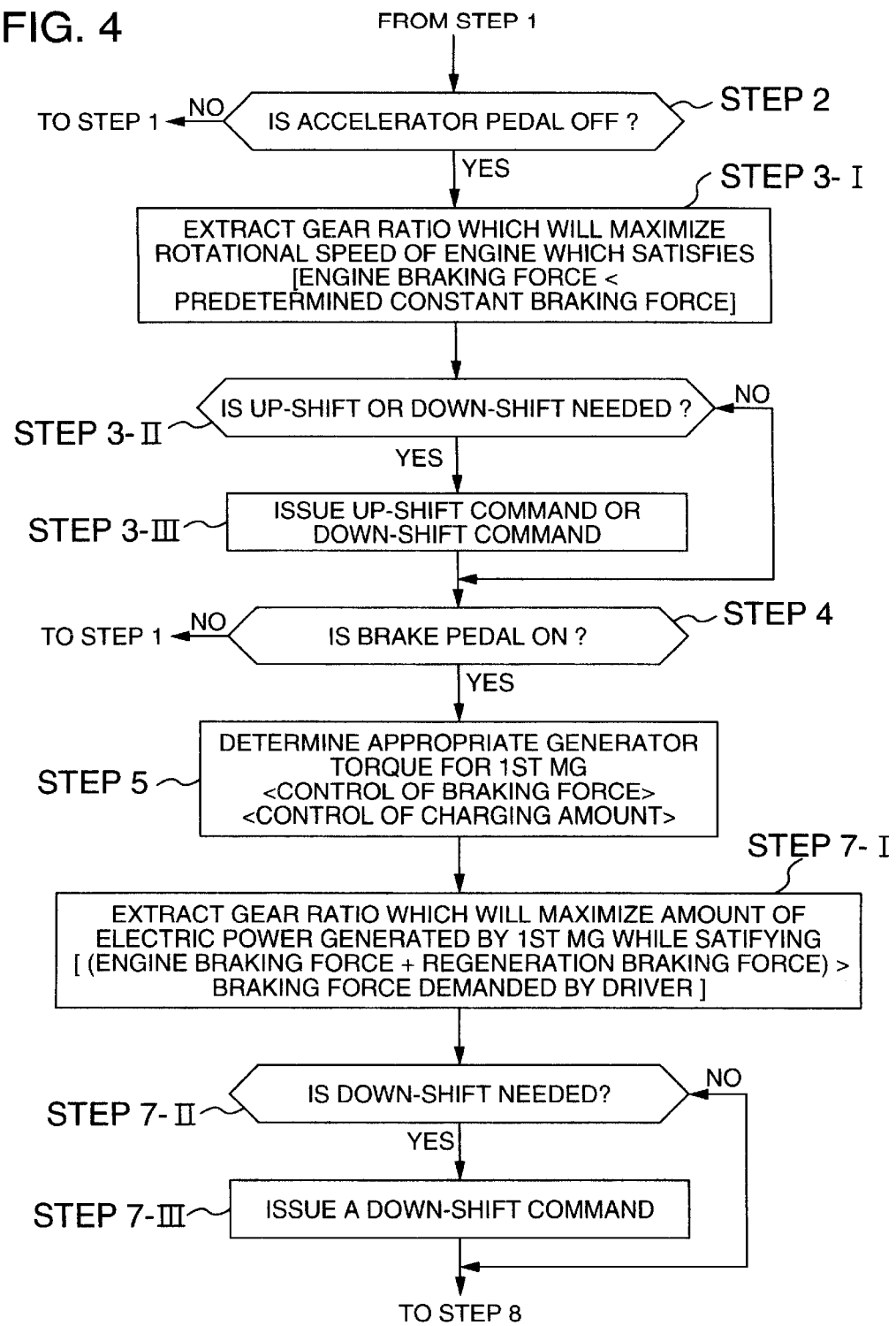
FIG. 4 is a view showing part of the control flow of operating condition control means.

FIG. 4 is part of the control flow of the operation mode 1A and shows the above-mentioned sequence of processes in Step 3 into Step 3-I, Step 3-II, and Step 3-III.

Figure 5:
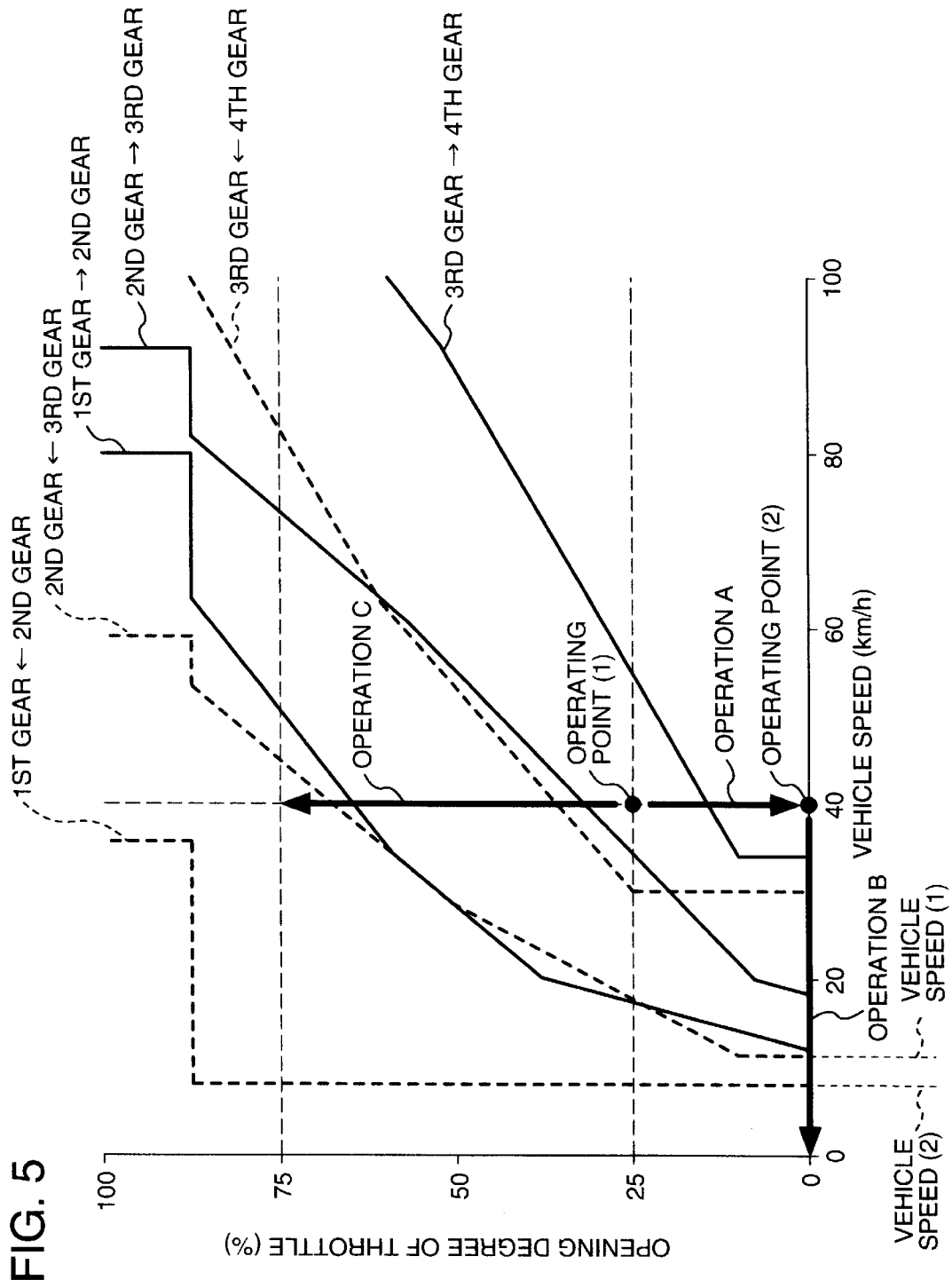
FIG. 5 is a speed change diagram of a four-speed automatic transmission.

FIG. 5 is a gear change diagram when the speed change means 104 is a four-speed automatic transmission. The horizontal axis represents vehicle speed and the vertical axis represents opening degree (0% to 100%) of the throttle. In FIG. 5, "Up-shift lines" indicated by solid lines represent boundaries of conditions for up-shifts. A shift from a first gear to a second gear of which gear ratio is the largest ("1st gear→2nd gear" in the drawing), a shift from the second gear to a third gear ("2nd gear→3rd gear" in the drawing), and a shift from the third gear to a fourth gear of which gear ratio is the smallest ("3rd gear→4th gear" in the drawing) are shown. "Down-shift lines" indicated by broken lines represent boundaries of conditions for down-shifts. A shift from the fourth gear to the third gear of which gear ratio is the smallest ("3rd gear←4th gear" in the drawing), a shift from the third gear to the second gear ("2nd gear←3rd gear" in the drawing), a shift from the second gear to the first gear of which gear ratio is the largest ("1st gear←2nd gear" in the drawing) are shown.

Description will be given hereinafter about a case in which the automobile 100 running at a constant speed, more specifically, the automobile 100 running at 40 km/h, 25% opening degree of the throttle and the third gear of the speed change means 104 enters deceleration running, for example, at operating point (1).

When the first MG 2 is not operated as a generator (regeneration) and speed change means control is not effected, if the accelerator pedal 114 shifts from the ON state to the OFF state, causing the opening degree of the throttle to change from 25% to 0% ("operation A" in the drawing), the control means 112 for the speed change means outputs an up-shift command to the speed change means 104 to shift from the third gear to the fourth gear since the "3rd gear→4th gear" up-shift line is crossed on the speed change diagram. In response to the command, the speed change means 104 performs gear change of up-shift from the third gear to the fourth gear.

However, if the first MG 2 is operated as a generator (regeneration) and speed change means control is effected, the control means 112 for the speed change means outputs the speed change command determined by the operating condition control means 10 to the speed change means 104. In response to the speed change command, the speed change means 104 maintains the current third gear for constant-speed running or performs gear shift to the first gear, the second gear, or the fourth gear.

An example of speed change means control has been described above about a case in which the speed change means 104 is a four-speed automatic transmission, but this similarly applies to other automatic transmissions and continuously variable transmissions.

By effecting the speed change means control as described above, the rotational speed of the engine 101 is increased and the rotational speed of the first MG 2 connected to the engine 101 is increased. Therefore, it is possible to increase an amount of energy recovered upon a shift to deceleration running.

Step 4 will be described hereinafter.

The operating condition control means 10 detects the ON/OFF state of the brake pedal 113, and when the brake pedal 113 enters the ON state, the step goes to Step 5. If the brake pedal 113 is in the OFF state, the step goes to Step 1, selection of operation mode is continued.

Steps 5 and 6 will be described hereinafter.

In order to make the first MG 2 recover deceleration energy, it is necessary to operate the first MG 2 as a generator (regeneration) so as to generate a negative rotational driving force. For that, the operating condition control means 10 determines an appropriate negative torque (hereinafter referred as generator torque) on the basis of braking force control and charging amount control (Step 5), and outputs this as a generator torque command (Step 6). In response to this command, the first MG 2 is operated as a generator (regeneration).

Now, an example of the braking force control in Step 5 will be described hereinafter.

An amount of deceleration energy recovered by the first MG 2 depends on the generator torque. Generally, if the generator torque is increased, an amount of deceleration energy to be recovered is increased accordingly. However, the negative rotational driving force generated by the first MG 2 accompanied with the operation as a generator (regeneration) is transmitted to the first wheel drive shaft 105 after being converted by the first driving force transmitting means 102 and the speed change means 104 and acts as a braking force on the automobile 100. Therefore, at the time of determining generator torque, the braking force demanded by the driver needs to be taken into consideration. Besides, difference in braking force between when the first MG 2 is operated as a generator (with regeneration) and when the first MG 2 is not operated as a generator (without regeneration) should be reduced to a degree that the driver does not experience an uncomfortable feeling. The braking force control is control satisfying the above conditions.

Figure 6:
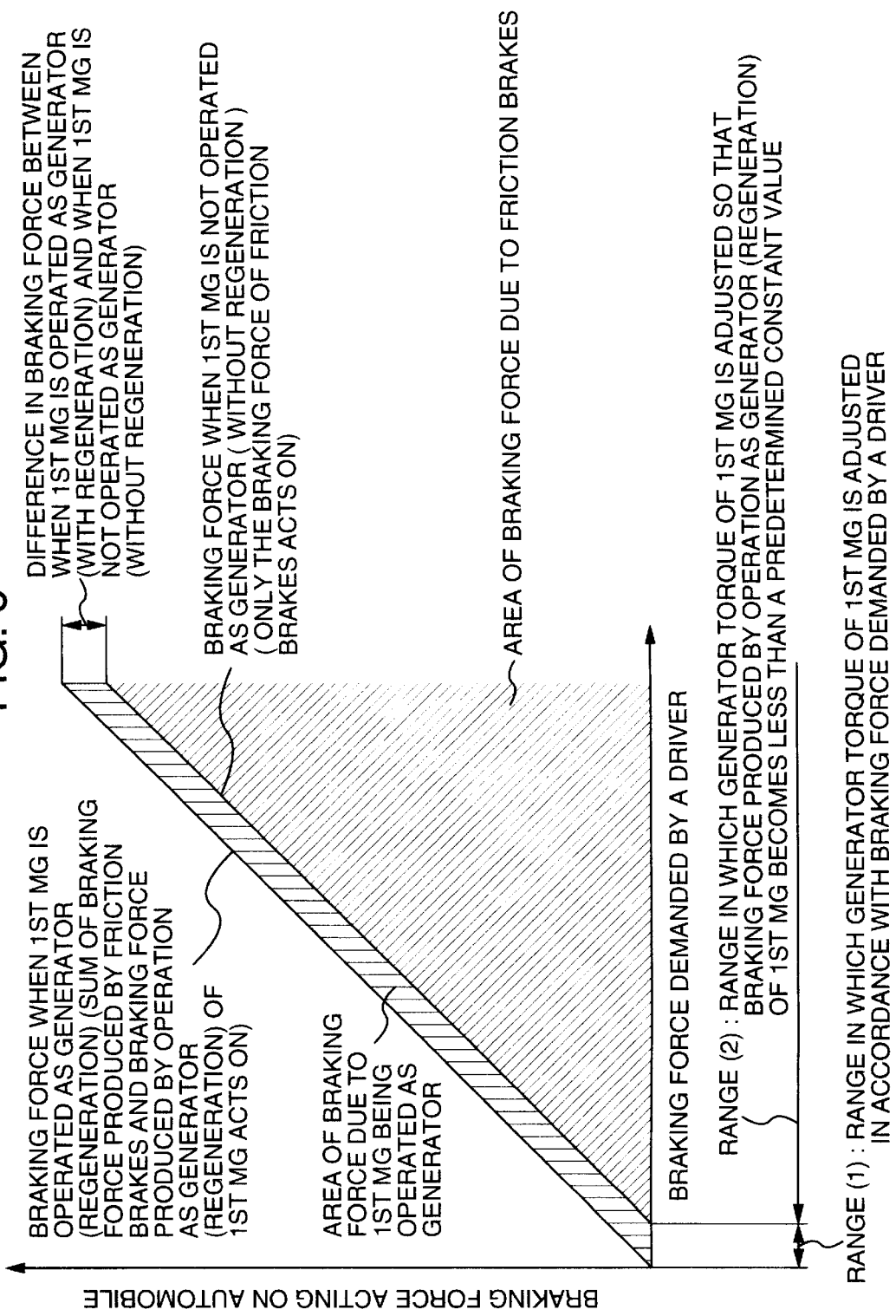
FIG. 6 is a view showing an example of braking force control based on operating condition control.

FIG. 6 is a view showing an example of the braking force control. The horizontal axis represents the braking force demanded by the driver detected by the demanded braking force detection means 21 and the vertical axis represents the braking force acting on the automobile 100. "Range (1)" is a range in which only the braking force produced by the generator operation (regeneration) of the first MG 2 acts on the automobile 100. In this range, the generator torque of the first MG 2 is adjusted according to the braking force demanded by the driver and control is effected so that the braking force produced by the generator operation (regeneration) of the first MG 2 becomes approximately equal to the braking force demanded by the driver. "Range (2)" is a range in which sum of the braking force produced by friction brakes (not shown) installed in the front wheels 107a and 107b and rear wheels 108a and 108b and the braking force produced by the generator operation (regeneration) of the first MG 2 acts on the automobile 100. In this range, the generator torque of the first MG 2 is adjusted so that the braking force produced by the generator operation (regeneration) of the first MG 2 does not exceed a predetermined certain value regardless of the braking force demanded by the driver. Also, control is effected so that sum of the braking force produced by the friction brakes and the braking force produced by the generator operation (regeneration) of the first MG 2 becomes approximately equal to the braking force demanded by the driver.

By effecting the braking force control described above, it is possible to produce braking force in conformity with the braking force demanded by the driver and difference in braking force between when the first MG 2 is operated as a generator (with regeneration) and when the first MG 2 is not operated as a generator (without regeneration) can be reduced to a degree that the driver does not experience a strange feeling.

In order to prevent the driver from experiencing a strange feeling, it is desirable that the braking force produced by the generator operation (regeneration) of the first MG 2 should be less than force which exerts deceleration of (0.05× gravitational acceleration) on the automobile 100

Now, an example of charging amount control in Step 5 will be described hereinafter.

An amount of deceleration energy recovered by the first MG 2 depends on generator torque. Generally, if the generator torque is increased, an amount of the deceleration energy to be recovered is increased accordingly, and the electric power to be charged into the battery 6 (hereinafter referred as charging electric power) also is increased. However, since the terminal voltage of the battery 6 becomes high in proportion to the charging electric power, it is necessary to take into consideration so that the terminal voltage of the battery 6 does not exceed a predetermined prescribed range (hereinafter referred as a prescribed voltage range) when deciding generator torque. Also, it is necessary to keep the charging rate of the battery 6 within a predetermined prescribed range not so as to lower the durability of the battery 6. The charging amount control is control satisfying the above conditions.

The prescribed voltage range is a range in which electric loads (not shown) to be connected to the battery 6, such as an electric air conditioner, an injector, lamps, etc. operate stably.

Figure 7:
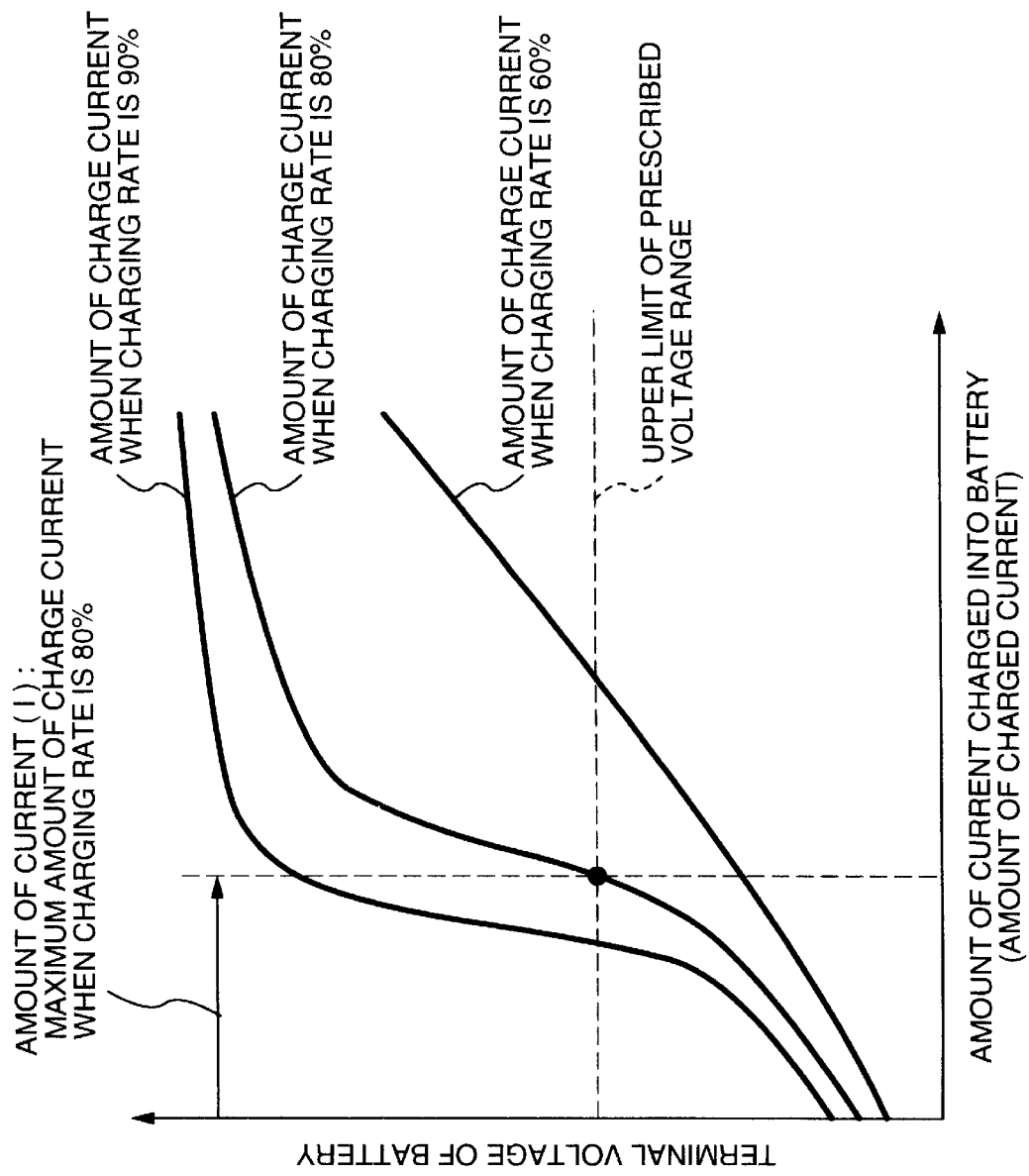
FIG. 7 is a view showing an example of charging amount control based on operating condition control.

FIG. 7 is a view showing an example of the charging amount control. The horizontal axis represents an amount of electric current (hereinafter referred as an amount of charge current) charged into the battery 6 and the vertical axis represents the terminal voltage of the battery 6. The drawing shows the relationship between the amount of charge current and the terminal voltage of the battery 6 when the charging rate of the battery 6, which varies in the range of 0% to 100%, is 60%, 80% and 90%. Such characteristics can be grasped beforehand as charging characteristics of the battery 6. Then, by referring to these characteristics, it is possible to know the maximum amount of charge current that the terminal voltage of the battery 6 does not exceed the prescribed voltage range. For example, when the charging rate of the battery 6 is 80%, "amount of current (1)" in the drawing represents the maximum amount of charge current, which gives the maximum charging electric power when multiplied by an upper limit value of the prescribed voltage range of the battery 6. This charging electric power, when divided by the charging efficiency of the battery 6, conversion efficiency of the first inverter 4, generating efficiency of the first MG 2, etc., gives generating driving input for the first MG 2. Based on this, the operating condition control means 10 determines the generator torque of the first MG 2.

Further, the operating condition control means 10 monitors the charging rate obtained from the battery condition detection means 24 and, on the basis of it, determines the generator torque of the first MG 2.

By effecting the charging amount control described above, it is possible to maximize the charging electric power in a range in which the terminal voltage of the battery 6 does not exceed its prescribed voltage range and it is possible to keep the charging rate of the battery 6 within a predetermined prescribed range.

Step 7 will be described hereinafter.

In and after Step 5, the accelerator pedal 114 is OFF and the brake pedal 113 is ON, and therefore, normally, the automobile 100 is in condition continuing deceleration running.

During the deceleration running, the control means 112 for the speed change means selects a gear ratio of the speed change means 104 on the basis of information such as opening degree of a throttle (not shown) located near the engine 101, vehicle speed and the like and with reference to a speed change diagram or the like (not shown), and issues a down-shift command (speed change which increases the gear ratio) to the speed change means 104. In response to the speed change command, the speed change means 104 performs gear change of down-shift.

In a case in which the operating condition control is not effected, as described above, a gear ratio selected with reference to the speed change diagram or the like is output as a speed change command to the speed change means 104, and in response to the command, the speed change means 104 performs gear change.

However, in a case in which the operating condition control based on the operation mode 1A is effected, the operating condition control means 10 issues to the control means 112 for the speed change means a command not to output a speed change instruction to the speed change means 104 on the basis of speed change means control and to output a speed change instruction to properly determine gear ratio of the speed change means 104 to the speed change means 104. With this, the speed change means 104 performs gear change to the gear ratio determined by the operating condition control means 10.

Description will be given hereinafter about an example of method to determine gear ratio of the speed change means 104 in Step 7 in a case where the first driving force transmitting means 102 is an electromagnetic clutch or hydraulic clutch or in a case where the first driving force transmitting means 102 is a torque converter which is clocked up.

The engine braking force acting on the automobile 100 is calculated by the engine braking force calculation means 22 on the basis of Equation (1), for example, as described above.

Further, the braking force acting on the automobile 100 by generator operation (regeneration) of the first MG 2, i.e., regenerative braking force is calculated by the regenerative braking force calculation means 23 on the basis of Equation (2), for example.

$$FR = (TG \times iP \times iG \times iF)/rW \quad \ldots \text{Equation (2)}$$

where FR is the regenerative braking force, TG is the generator torque of the first MG 2, and iP is a pulley ratio between the first MG 2 and engine 101.

The operating condition control means 10 estimates changes in the gear ratio of the speed change means 104 accompanied with gear change and changes in the friction torque of the engine 101, extracts gear ratio which maximizes an amount of electric power generated by the first MG 2 in a range sum of the engine braking force calculated, for example, according to Equation (1) and the regenerative braking force calculated, for example, according to Equation (2) does not exceed the braking force demanded the driver, and then, on the basis of this, determines a value, which the speed change means 104 can actually adopt, to gear ratio.

Further, the braking force demanded by the driver is calculated, for example, in proportional relation, by the demanded braking force detection means 21 on the basis of stroke of the brake pedal 113 or pedal pressure.

Further, an amount of electric power generated by the first MG 2 can be obtained by grasping in advance electric power generation characteristics of which parameters are the rotational speed and the generator torque of the first MG 2 and by keeping them as a map.

Hereinafter, description will be given about an example of method to determine gear ratio of the speed change means 104 in Step 7 in a case where the first driving force transmitting means 102 is a torque converter which is not locked up.

Engine braking force acting on the automobile is calculated by the engine braking force calculation means on the basis of Equation (3), for example.

$$i\,FE = ((NOUT \times NOUT) \times t \times iG \times iF)/rW \quad \ldots \text{Equation (3)}$$

where NOUT is the rotational speed of the first driving force transmitting means 102 on the side of the speed change means 104, t is the torque capacity of the torque converter serving as the first driving force transmitting means 102.

Incidentally, the rotational speed NOUT of the first driving force transmitting means 102 on the side of the speed change means 104 is calculated on the basis of Equation (4).

$$NOUT = (VV/rW) \times iG \times iF \quad \ldots \text{Equation (4)}$$

where VV is vehicle speed, which is calculated by the vehicle speed calculation means 20.

Further, the torque capacity t of the torque converter is uniquely determined by velocity ratio e defined by Equation (5). Values grasped in advance can be retained as a map.

$$e = NOUT/NIN \quad \ldots \text{Equation (5)}$$

where NIN is the rotational speed of the first driving force transmitting means 102 on the side of the engine 101, i.e., the rotational speed of the engine 101.

The operating condition control means 10 estimates changes in the gear ratio of the speed change means 104 and changes in the rotational speed and friction torque of the engine 101, resulting from speed changes, extracts gear ratio which maximizes an amount of electric power generated by the first MG 2 in a range in which engine braking force calculated, for example, according to Equation (3) does not exceed the braking force demanded by the driver, and then on the basis of this, determines a value, which the speed change means 104 can actually adopt, to gear ratio.

The gear ratio determined above is output as a speed change command to the speed change means 104 and gear change is performed. However, If the speed change means 104 is a multi-speed automatic transmission, gear change of down-shift is done when the value determined above exceeds an available gear ratio since there is a limit of the number of available gears.

Further, in order to reduce the friction torque of the engine 101, it is possible to carry out adjustment of the opening degree of the throttle (not shown) as well as the valve timing or the like of intake and exhaust valves (not shown) installed in the engine 101. With this, it is possible to further increase an amount of electric power generated by the first MG 2.

FIG. 4 is a part of the control flow of the operation mode 1A and shows the above-described series of sequence of processes in Step 7 as Step 7-I, Step 7-II and Step 7-III.

Referring to FIG. 5, description will be given hereinafter about a case in which the automobile 100 continues deceleration running from an operating point (2), more specifically, vehicle speed is 40 km/h, the opening degree of the throttle is 0% and the gear ratio of the speed change means 104 is third gear determined by the speed change means control in Step 3.

In a case where the first MG 2 is not operated as a generator (regeneration) and speed change means control is not effected, if the vehicle speed is lowered as a result of continuation of the deceleration running ("operation B" in the drawing), the control means 112 for the speed change means outputs a down-shift command to the speed change means 104 to shift from third gear to second gear when the "2nd gear←3rd gear" down-shift line is crossed on the speed change diagram, i.e., when the vehicle speed reaches "vehicle speed (1)". Similarly, the control means 112 for the speed change means outputs a down-shift command to the speed change means 104 to shift from second gear to first gear when "1st gear←2nd gear" down-shift line is crossed, i.e., when the vehicle speed reaches "vehicle speed (2)". In response to these commands, the speed change means 104 performs gear changes of down-shift. That is, if the same speed change diagram is used, gear changes of down-shift are always performed at fixed vehicle speeds, respectively.

However, when the first MG 2 is operated as a generator (regeneration) and the speed change means control is effected, the control means 112 for the speed change means outputs to the speed change means 104 a down-shift command to shift from third gear to second gear and a down-shift command to shift from second gear to first gear so as to maximize an amount of electric power generated by the first MG 2. In response to these commands, the speed change means 104 performs each of gear changes of down-shift. That is, the vehicle speeds at which down-shifts are made are not fixed, but varies depending on the driving state.

An example of the speed change means control has been described above about a case in which the speed change means 104 is a four-speed automatic transmission, but this similarly applies to other automatic transmissions and continuously variable transmissions.

The use of the speed change means control as described above increases an amount of electric power generated by the first MG 2, and therefore, it is possible to increase the deceleration energy to be recovered.

Step 8 will be described hereinafter.

If due to continuation of the deceleration running, the rotational speed of the first driving force transmitting means 112 on the side of the speed change means 104 falls below a predetermined value such as idling speed (hereinafter referred as the minimum necessary rotational speed) and the engine 101 is forced to generate rotational driving force to maintain rotation, it is not desirable in terms of fuel economy to operate the first MG 2 as a generator (regeneration). For this reason, if driving in accordance with the operation mode 1A is no longer applicable, step shifts to Step 1 to select another operation mode. If driving in accordance with the operation mode 1A remains in effect, the step goes to Step 9.

Step 9 will be described hereinafter.

The operating condition control means 10 judges whether it is necessary to shift to another operation mode. If it is, process goes to Step 1. If it is not necessary, process goes to Step 4, where the operating conditions control in accordance with the operation mode 1A is continued.

Steps 2 to 9 are the operating condition control and processes on the basis of the operation mode 1A.

Figure 8:
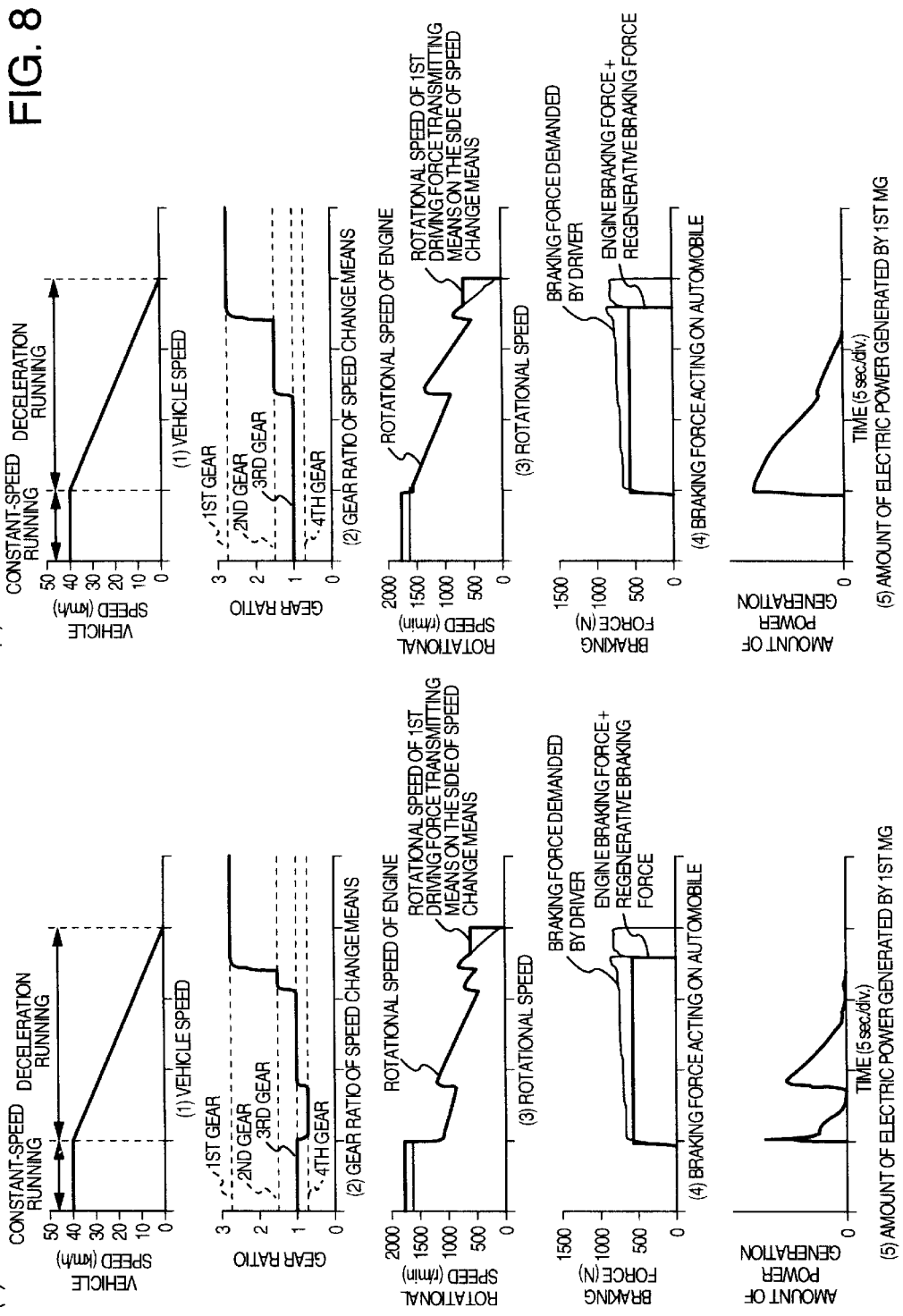
FIG. 8 is views showing time charts depicting vehicle speed, gear ratio of speed change means, rotational speed, braking force acting on an automobile, and amount of electric power generated by a first motor-generator.

Referring to FIG. 8, description will be given hereinafter about advantages of the operating condition control based on the operation mode 1A citing a case in which the first driving force transmitting means 102 is an electromagnetic clutch, hydraulic clutch, or locked-up torque converter and the speed change means 104 is a four-speed automatic transmission.

FIG. 8 shows various time charts which depict processes in which the automobile 100 shifts from constant-speed running to deceleration running and stops eventually. FIG. 8(a) shows a case in which the operating condition control is not effected while FIG. 8(b) shows a case in which the operating condition control is effected. Charts (1) in FIGS. 8(a) and 8(b) are time charts of vehicle speed. Charts (2), which are time charts of the gear ratio of the speed change means 104, depict gear changes from third gear (gear ratio=1) in which the automobile 100 is running at a constant speed to first gear (gear ratio=2.8) which corresponds to a stopped state. In this case, available gear ratios are four at the maximum. Gear ratios upon transitional between each gear do not exist in fact. Charts (3) are time charts which depict the rotational speed of the engine 101 and rotational speed of the first driving force transmitting means 102 on the side of the speed change means 104. Charts (4), which are time charts of the braking force acting on the automobile 100, represent the braking force demanded by the driver and sum of the engine braking force and the regenerative braking force. Charts (5) are time charts of an amount of electric power generated by the first MG 2.

At the time of shifting from constant-speed running to deceleration running in a case in which the operating condition control is not effected, the speed change means 104 performs gear change of up-shift from third gear to fourth gear as shown in FIG. 8(a)(1). However, if the operating condition control is effected, the speed change means 104 maintains the current third gear for constant-speed running as shown in FIG. 8(b)(1). Also, the speed change means 104 performs gear changes of down-shift from third gear to second gear and from second gear to first gear so as to maximize an amount of electric power generated by the first MG 2. Consequently, the amount of electric power generated by the first MG 2 is increased in comparison with a case in which the operating condition control is not effected, as shown in FIG. 8(a)(5). The sum of the engine braking force and the regenerative braking force at this time is kept smaller than the braking force demanded by the driver.

Figure 9:
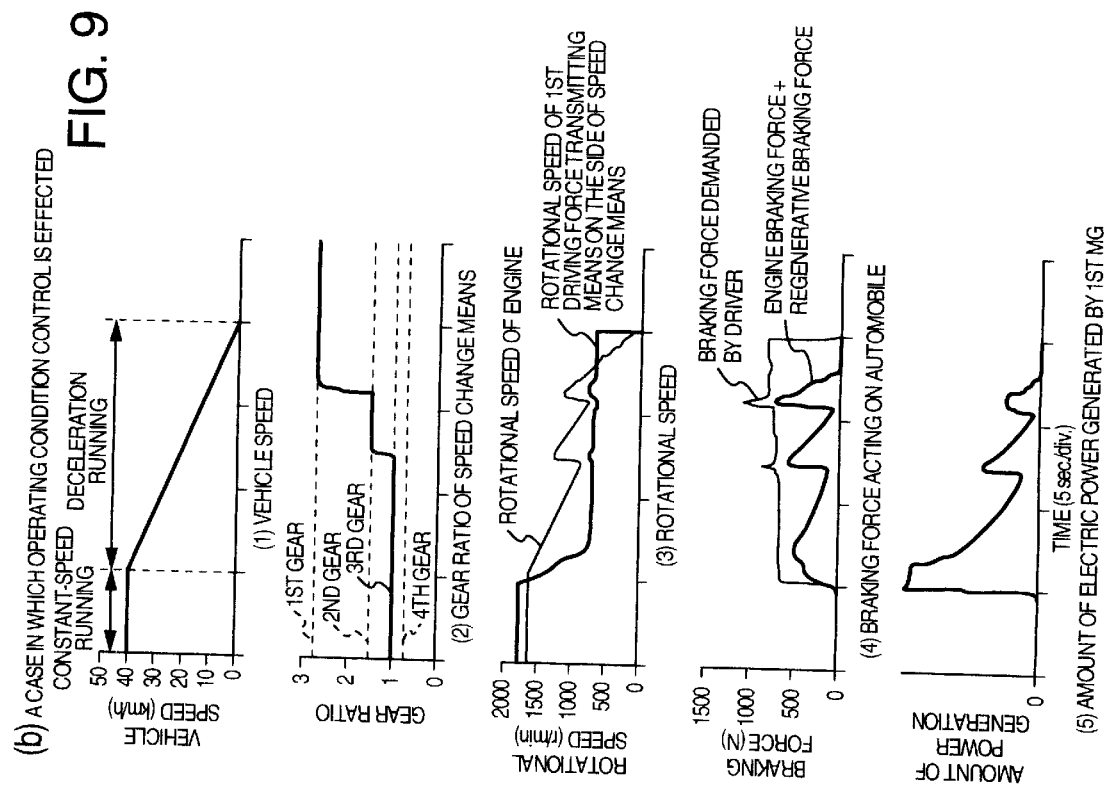
FIG. 9 is views showing time charts depicting vehicle speed, gear ratio of speed change means, rotational speed, braking force acting on an automobile, and amount of electric power generated by a first motor-generator.

FIG. 9 shows advantages of a case in which the operating condition control based on the operation mode 1A is effected, citing another example in which the first driving force transmitting means 102 is a torque converter which is not locked up and the speed change means 104 is a four-speed automatic transmission.

As is the case with the example of FIG. 8, an amount of electric power generated by the first MG 2 is increased in comparison with a case in which the operating condition control is not effected, as shown in FIG. 9(a)(5). The sum of the engine braking force and the regenerative braking force at this time is kept smaller than the braking force demanded by the driver.

The advantages of the operating condition control based on the operation mode 1A has been described above, citing cases in which the first driving force transmitting means 102 is an electromagnetic clutch, hydraulic clutch, locked-up torque converter, or torque converter not locked up and the speed change means 104 is a four-speed automatic transmission. As described above, the present invention can provide advantages against any one of structures in which any one of the above-mentioned first driving force transmitting means 102 and any one of the above-mentioned speed change means 104 are combined.

Now, description will be given hereinafter about a case in which the operation mode 1B is selected in Step 1, i.e., a case in which the operating status of the first MG 2 is free and the operating status of the second MG 3 is regeneration.

Step 10 will be described hereinafter.

The operating condition control means 10 detects the ON/OFF state of the brake pedal 113, and when the brake pedal 113 becomes an ON state, the process goes to Step 5'. If the brake pedal 113 is in the OFF state, the process goes to Step 1, where selection of operation mode is continued.

Steps 5' and 6' will be described hereinafter.

Step 5' is similar to Step 5.

Step 6' is similar to Step 6.

Step 11 will be described hereinafter.

If, due to continuation of the deceleration running, the rotational speed of the second wheel drive shaft 106 decreases and the rotational speed of the second MG 3 connected to the second wheel drive shaft 106 via the second driving force transmitting means 103 falls below the rotational speed which generation output is obtained, it becomes impossible to operate the second MG 3 as a generator (regeneration). If it becomes impossible to operate the second MG 3 as a generator (regeneration) for this reason, for example, and driving in accordance with the operation mode 1B is no longer applicable, the process goes to Step 1 to select another operation mode. If operation in accordance with the operation mode 1B remains in effect, the process goes to Step 12.

Step 12 will be described hereinafter.

The operating condition control means 10 judges whether it is necessary to shift to another operation mode. If it is, the process goes to Step 1. If it is not necessary, the process goes to Step 10, where the operating condition control based on the operation mode 1B is continued.

Steps 10 to 12, Step 5' and Step 6' described above are the operating condition control and processes based on the operation mode 1B.

Now, description will be given hereinafter about a case in which the operation mode 1C is selected in Step 1, i.e., a case in which the operating status of both first MG 2 and the second MG 3 are regeneration.

Step 13 will be described hereinafter.

The operating condition control means 10 detects the ON/OFF state of the accelerator pedal 114, and when the accelerator pedal 114 enters an OFF state, the process goes to Step 3'. If the accelerator pedal 114 is in the ON state, the process goes to Step 1, where selection of operation mode is continued.

Step 3' will be described hereinafter.

Step 3' is similar to Step 3.

Step 14 will be described hereinafter.

The operating condition control means 10 detects the ON/OFF state of the brake pedal 113, and when the brake pedal 113 becomes an ON state, the process goes to Step 15. If the brake pedal 113 is in the OFF state, the process goes to Step 1, where selection of operation mode is continued.

Steps 15 and 6' will be described hereinafter.

On the basis of generator torque distribution control as well as the braking force control and the charging amount control described above, the operating condition control means 10 determines appropriate generator torque (Step 15) and outputs as a generator torque command (Step 6'). In response, the first MG 2 and the second MG 3 are operated as generators (regeneration).

Now, an example of the generator torque distribution control in Step 15 will be described hereinafter.

An amount of deceleration energy recovered by the first MG 2 and the second MG 3 depends on the generator torque. In general, if the generator torque is increased, the amount of deceleration energy to be recovered is increased accordingly. However, this is true only if the generator efficiencies of the first MG 2 and the second MG 3 are constant irrespective of operating conditions, and actually it is not necessarily true because the generator efficiencies vary depending on operating conditions such as rotational speed and generator torque. Therefore, at the time of determining generator torque, the generator efficiencies of the first MG 2 and the second MG 3 need to be taken into consideration. The generator torque distribution control is control satisfying the above conditions.

Figure 10:
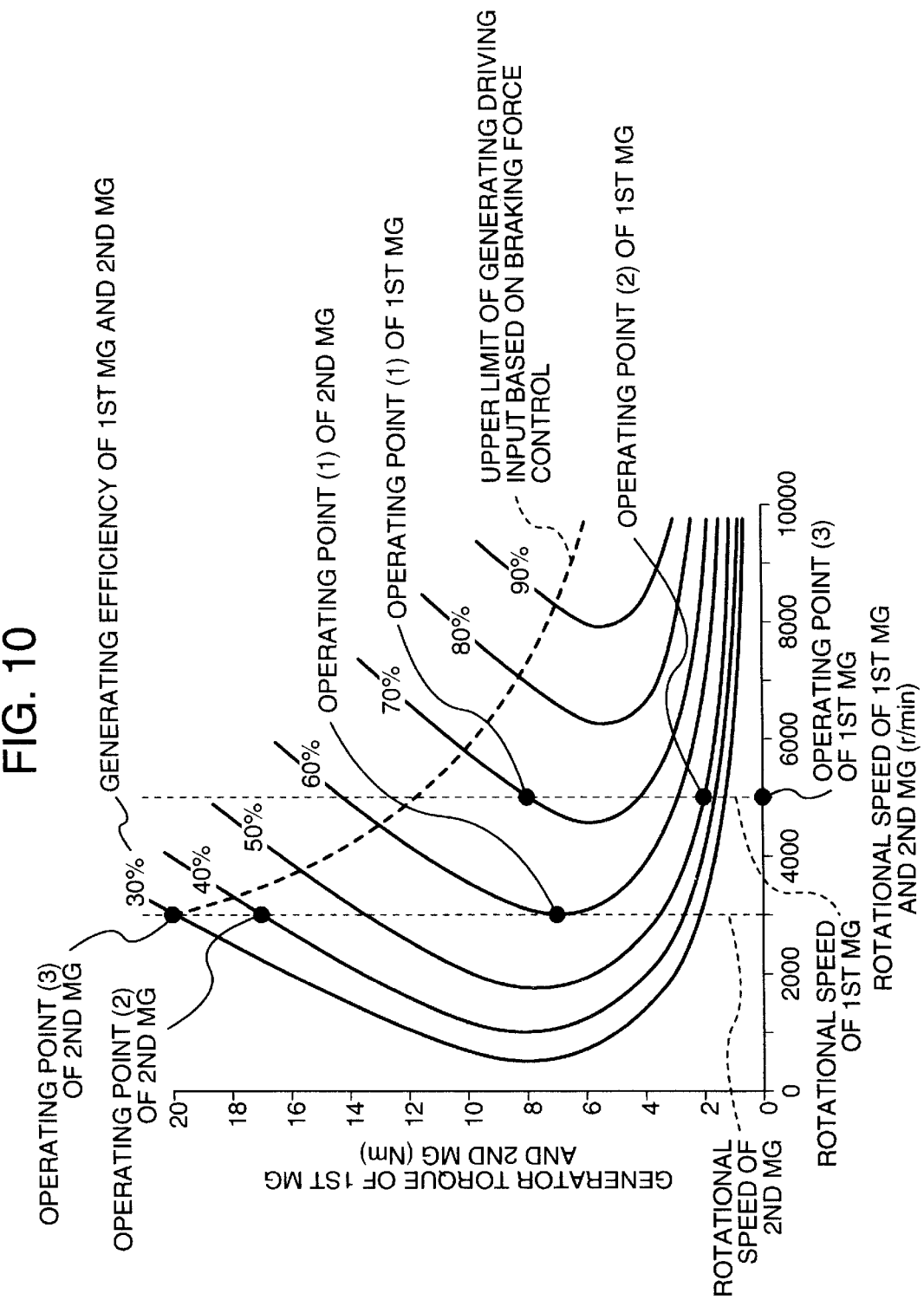
FIG. 10 is a view showing an example of generator torque distribution control based on operating condition control.

FIG. 10 is a view showing an example of the generator torque distribution control. The horizontal axis represents the rotational speed of the first MG 2 and the second MG 3 and the vertical axis represents the generator torque of the first MG 2 and the second MG 3. The drawing shows iso-generator-efficiency curves at intervals of 10% between 30 and 90% when the first MG 2 and the second MG 3 have the same generator efficiency. These characteristics can be grasped beforehand as generator characteristics, and then generator torque distribution control is performed in accordance with them.

With reference to FIG. 10, description will be given about an example of generator torque distribution control with respect to the first MG 2 and the second MG 3 having the generator characteristic shown in FIG. 10 in a case in which sum of the generation outputs from the first MG 2 and the second MG 3 is maximized.

FIG. 10 shows the rotational speeds of the first MG 2 and the second MG 3 (5000 r/min and 3000 r/min, respectively, in this case) at any vehicle speed during deceleration running and an upper limit vale of sum of generating inputs for the first MG 2 and the second MG 3 based on the braking force control (hereinafter referred as the upper limit value of generating input based on the braking force control). These values are not necessarily the same as those described above or shown in the drawing because they depend on the pulley ratio between the first MG 2 and the engine 101, gear ratio of the speed change means 104, reduction gear ratio of the second driving force transmitting means 103, an upper limit value of the raking force produced by generator operation (regeneration), vehicle speed, etc.

If the rotational speeds of the first MG 2 and the second MG 3 are denoted by $N_{MG1G}$ and $N_{MG2G}$, respectively, their generator torques are denoted by $T_{MG1G}$ and $T_{MG2G}$, respectively, their generator efficiencies are denoted by $\eta_{MG1G}$ and $\eta_{MG2G}$, respectively, and the upper limit value of generating input based on the braking force control is denoted by $W_{LIMITG}$, valid $T_{MG1G}$ and $T_{MG2G}$ values should satisfy $(((N_{MG1G} \times 2 \times \pi/60) \times T_{MG1G}) + ((N_{MG2G} \times 2 \times \pi/60) \times T_{MG2G}) \leq W_{LIMITG}$ (hereinafter referred as generator torque determination criterion (1)) and there are in countless numbers.

However, in a case where the operating condition control based on the operation mode 1C is effected, the operating condition control means sets operating points of the first MG 2 and the second MG 3 at "operating point (1) of the first MG 2" and "operating point (1) of the second MG 3" in the drawing so as to maximize sum of the generating outputs from the first MG 2 and the second MG 3 (hereinafter referred as the sum of generating outputs), namely $(((N_{MG1G} \times 2 \times \pi/60) \times T_{MG1G} \times \eta_{MG1G}) + ((N_{MG2G} \times 2 \times \pi/60) \times T_{MG2G} \times \eta_{MG2G})$, on the basis of the generator torque distribution control, and then determines generator torque on the basis of the operating points determined. With this, the sum of generating outputs are maximized and the generator torque determination criterion (1) is satisfied at the same time. For example, the sum of generating outputs is increased by approximately 60% in comparison with a case where the first MG 2 and the second MG 3 are operated as generators (regeneration) at "operating point (2) of the first MG 2" and "operating point (2) of the second MG 3W in the drawing.

Next, with reference to FIG. 10, description will be given hereinafter about an example of the generator torque distribution control intended to minimize charging power for the purpose of keeping the charging rate of the battery 6 within a prescribed range as well as to eliminate difference in the braking force between when the first MG 2 and the second MG 3 are operated as generators (with regeneration) and when the first MG 2 and the second MG 3 are not operated as generators (without regeneration).

In this case, based on the generator torque distribution control, the operating condition control means 10 sets the operating points of the first MG 2 and the second MG 3 at "operating point (3) of the first MG 2" and "operating point (3) of the second MG 3" in the drawing so as to minimize the sum of the generating outputs from the first MG 2 and the second MG 3 while satisfying $(((N_{MG1G} \times 2 \times \pi/60) \times T_{MG1G}) + ((N_{MG2G} \times 2 \times \pi/60) \times T_{MG2G}) = W_{LIMITG}$ (hereinafter referred as generator torque determination criterion (2)), and then determines generator torque on the basis of the operating points determined. With this, the sum of generating outputs is minimized and the generator torque determination criterion (2) is satisfied at the same time. For example, the sum of generating outputs is less than half the total output produced when the first MG 2 and the second MG 3 are operated as generators (regeneration) at "operating point (1) of the first MG 2" and "operating point (1) of the second MG 3" in the drawing.

By effecting the generator torque distribution control described above, it is possible to maximize the sum of generating outputs from the first MG 2 and the second MG 3. Further, it is possible to keep the charging rate of the battery 6 within a prescribed range as well as to eliminate the difference in the braking force between when the first MG 2 and the second MG 3 are operated as generators (with regeneration) and when the first MG 2 and the second MG 3 are not operated as generators (without regeneration).

In addition, generally, the generating efficiencies of the first MG 2 and the second MG 3 tend to increase with increment of the rotational speed. Thus, to increase generating outputs, it is desirable to operate the first MG 2 and the second MG 3 as generators at high rotational speed. In this respect, the auxiliary drive 1 according to the embodiment of the present invention, which can operate the first MG 2 as a generator at high rotational speed corresponding to the pulley ratio between the engine 101 and the first MG 2 (which is defined as "rotational speed of the first MG 2/rotational speed of the engine 101" and takes a value larger than 1), is superior to a structure (pulley ratio=1) in which the first MG 2 is disposed, for example, between the engine 101 and the first driving force transmitting means 102.

Step 7' will be described hereinafter.

Step 7' is similar to Step 3.

Step 16 will be described hereinafter.

If either the first MG 2 or the second MG 3 cannot be operated as a generator (regeneration) and consequently operation in accordance with the operation mode 1C is no longer applicable, the process goes to Step 1 to select another operation mode. If operation in accordance with the operation mode 1C remains in effect, the process goes to Step 17.

Step 17 will be described hereinafter.

The operating condition control means 10 judges whether it is necessary to shift to another operation mode. If it is, the process goes to Step 1. If it is not necessary, the process goes to Step 14, where the operating condition control based on the operation mode 1C is continued.

Steps 13 to 17, Step 3', Step 6' and Step 7' above are the operating condition control and processes based on the operation mode 1C.

Description has been given above about the operating condition control for recovering deceleration energy efficiently in the case where the automobile 100 shifts from constant-speed running or acceleration running to deceleration running and continues deceleration running. Now, description will be given about operating condition control for operating the first MG 2 and the second MG 3 mainly as motors using recovered deceleration energy stored in the battery as an energy source in order to improve the operability, comfortableness, safety, and even fuel economy of the automobile 100.

Now, description will be given about a case in which the automobile 100 starts and continues acceleration running or constant-speed running. In this case, the first MG 2 and the second MG 3 are operated in accordance with operation mode 2A, 2B, 2C, 2D, or 2E to improve the operability, comfortableness, safety, and even fuel economy of the automobile 100.

Now, the operating condition control and processes performed by the operating condition control means 10 will be described with reference to the control flows in FIGS. 11 and 12.

As state of the engine 101 in state that the automobile 100 is stopped, there are two states: a state in which the engine 101 is rotating at the minimum necessary rotational speed (hereinafter referred as an idling state) and a stopped state (hereinafter referred as an idling stop state).

Step 20 will be described hereinafter.

At the same time when the automobile 100 starts, the operating condition control means 10 selects an optimum operation mode on the basis of information such as the terminal voltage and charging rate of the battery 6 obtained from the battery condition detection means 24, information obtained from the demanded braking force detection means 21 and demanded driving force detection means 25, information such as cooling water temperature, intake and exhaust temperature and combustion condition obtained from the engine 101, motor characteristics (torque characteristics, motor efficiency, etc.) and generator characteristics (generating output, generating efficiency, etc.) of the first MG 2 and the second MG 3.

In addition, at the time of selecting an operation mode, it is possible to take into consideration the driver's acceleration performance improvement request obtained by acceleration performance improvement request detection means (not shown) of the automobile 100.

Now, an example of operation mode selection in Step 20 will be described hereinafter.

At starting from an idling stop state and during the engine 101 being restarted by operating the first MG 2 as a motor, if the driver issues a start request or acceleration request, it is desirable to operate the first MG 2 and the second MG 3 as motors in response to the driving force demanded by the driver to assist the engine 101 which cannot generate the required rotational driving force.

For example, if the driving force demanded by the driver is larger than driving force corresponding to the rotational driving force of the engine 101 and less than sum of the rotational driving force of the engine 101 and rotational driving force of the first MG 2, the operation mode 2A is selected.

For example, if the driving force demanded by the driver is larger than driving force corresponding to the rotational driving force of the engine 101 and less than sum of the rotational driving force of the engine 101 and rotational driving force of the second MG 3, the operation mode 2B is selected.

For example, if the driving force demanded by the driver is larger than the rotational driving force of the engine 101 and less than sum of the rotational driving force of the engine 101 and rotational driving force of the first MG 2 and the second MG 3, the operation mode 2C is selected.

With this, it is possible to generate the driving force which matches the driving force demanded by the driver and to start the automobile 100 smoothly.

In addition, when the automobile 100 is running on a low coefficient of friction road, it is desirable to operate the second MG 3 as a motor.

Road conditions are inferred from the slip rate obtained from the vehicle speed and the wheel speed.

For example, in a stable state (the slip rate is approximately 0.2 or less) in which the front wheels 107a and 107b and the rear wheels 108a and 108b both produce stable driving force with respect to the road surface, the operation mode 2B is selected to control the slip rate such that the maximum driving force is generated between the rear wheels 108a and 108b and road surface by operating the second MG 3 as a motor.

An example of the relationship between the slip rate and the driving force produced between the wheels 107a, 107b, 108a, and 108b and the road surface in this case is shown in FIG. 13. FIG. 13(a) shows a case in which the second MG 3 is not operated as a motor, and the front wheels 107a and 107b operate at the "operating point of the front wheels" in the drawing while the rear wheels 108a and 108b operate at "operating point (1) of the rear wheels" in the drawing. They are both in a stable state. FIG. 13(b) shows a case in which the second MG 3 is operated as a motor in accordance with the operation mode 2B, and the front wheels 107a and 107b operate at the "operating point of the front wheels" in the drawing while the rear wheels 108a and 108b operate at "operating point (2) of the rear wheels" in the drawing. They are both in a stable state. That is, the driving force generated between the rear wheels 108a and 108b and the road surface by operating the second MG 3 as a motor in accordance with the operation mode 2B, and therefore, the total driving force, which is sum of the driving force of the front wheels 107a and 107b and the driving force of the rear wheels 108a and 108b becomes large.

In an unstable state (the slip rate is substantially higher than 0.2) in which, for example, the front wheels 107a and 107b produce unstable driving force with respect to the road surface, operation mode 2E is selected to reduce the rotational driving force of the engine 101 by operating the first MG 2 as a generator such that the front wheels 107a and 107b produce stable driving force with respect to the road surface as well as to control the slip rate by operating the second MG 3 as a motor such that the maximum driving force are generated between the rear wheels 108a and 108b and road surface.

An example in this case of the relationship between the slip rate and the driving force produced between the wheels 107a, 107b, 108a, and 108b and the road surface is shown in FIG. 14. FIG. 14(a) shows a case in which the first MG 2 is not operated as a generator and the second MG 3 is not operated as a motor, and the front wheels 107a and 107b operate at "operating point (1) of the front wheels" while the rear wheels 108a and 108b operate at "operating point (1) of the rear wheels" in the drawing. Only the rear wheels 108a and 108b are in a stable state. FIG. 14(b) shows a case in which the first MG 2 is operated as a generator and the second MG 3 is operated as a motor in accordance with operation mode 2E, and the front wheels 107a and 107b operate at "operating point (2) of the front wheels" while the rear wheels 108a and 108b operate at "operating point (2) of the rear wheels" in the drawing. They are both in a stable state. That is, by operating the first MG 2 as a generator and the second MG 3 as a motor in accordance with the operation mode 2E, both the driving forces generated by both front wheels 107a and 107b and rear wheels 108a and 108b with respect to the road surface become large, so that total driving force, which is sum of the driving force of the front wheels 107a and 107b and the driving force of the rear wheels 108a and 108b, becomes large.

Accordingly, it is possible to improve the safety and operability of the automobile 100 at running on a low coefficient of friction road. Also, it is possible to hill-climb run on a relatively high steep and low coefficient friction road.

Further, if the charging rate of the battery 6 hovers near the lower limit value of a predetermined prescribed range, operation mode 2D or 2E is selected to raise the charging rate of the battery 6 by operating the first MG 2 as a generator.

The above is an example of selection of operation mode in Step 20. However, selection of operation mode is not always the same as described above, and an optimum operation mode is selected on the basis of the various information described above.

Description will be given hereinafter about a case in which operation mode 2A is selected in Step 20, i.e., a case in which the operating status of the first MG 2 is motoring and the operating status of the second MG 3 is free.

Step 21 will be described hereinafter.

The operating condition control means 10 detects the ON/OFF state of the accelerator pedal 114, and when the accelerator pedal 114 becomes an ON state, the process goes to Step 22. If the accelerator pedal 114 is in the OFF state, the process goes to Step 20, where selection of operation mode is continued.

Step 22 will be described hereinafter.

As described above, during running, the control means 112 for the speed change means selects a gear ratio of the speed change means 104 with reference to a speed change diagram or the like (not shown) on the basis of information such as the opening degree of the throttle (not shown) located near the engine 101, vehicle speed and other information, and outputs speed change command of up-shift (speed change decreasing the gear ratio) and down-shift (speed change increasing the gear ratio) to the speed change means 104. In response to the speed change command, the speed change means 104 performs either the above-mentioned gear changes.

At the time of shifting from constant-speed running (or acceleration running in some cases) to acceleration running in a case in which operating condition control is not effected, when an amount of depression of the accelerator pedal 114 becomes large, so that the opening degree of the throttle becomes large, the control means 112 for the speed change means may output a down-shift command to the speed change means 104 in accordance with the above-described manner. In response to this speed change command, the speed change means 104 performs gear change of down-shift.

However, in a case in which the operating condition control based on the operation mode 2A is effected, the operating condition control means 10 issues to the control means 112 for the speed change means a command not to output a speed change instruction to the speed change means 104 on the basis of speed change means control and to output a speed change instruction to properly determine gear ratio of the speed change means 104 to the speed change means 104. With this, the speed change means 104 performs gear change to the gear ratio determined by the operating condition control means 10.

Referring to FIG. 5, description will be given hereinafter about a case in which the automobile 100 shifts from a state that the automobile 100 is running at a constant speed at "operating point (1)", for example, more specifically, the automobile 100 is running at 40 km/h and the opening degree of the throttle is 25% and the gear of the speed change means 104 is third gear, to acceleration running.

In a case in which the first MG 2 is not operated as a motor and the speed change means control is effected, when the depression amount of the accelerator pedal 114 becomes large for acceleration running and the opening degree of the throttle changes from 25% to 75%, for example, ("operation C" in the drawing), the "2nd gear←3rd gear" down-shift line is crossed on the speed change diagram, so that the control means 112 for the speed change means outputs a down-shift command to the speed change means 104 to shift from third gear to second gear. In response to the command, the speed change means 104 performs gear change of down-shift from third gear to second gear.

However, if the first MG 2 is operated as a motor and the speed change means control is effected, the control means 112 for the speed change means outputs the speed change command determined by the operating condition control means 10 to the speed change means 104. In response to the speed change command, the speed change means 104 maintains the current third gear for constant-speed running.

An example of speed change means control has been described above citing a case in which the speed change means 104 is a four-speed automatic transmission, but the above-described processes can be applied to cases in which the speed change means 104 is other automatic transmissions or continuously variable transmissions.

The use of the speed change means control as described above reduces the number of down-shifts and up-shifts, eliminating sharp increases in the rotational speed of the engine 101 and sharp changes in driving force due to gear changes. Therefore, the comfortableness and the operability of the automobile 100 are improved and its fuel economy and discharge performance are improved.

Steps 23 and 24 will be described hereinafter.

Based on driving force control and charging amount control, the operating condition control means 10 determines appropriate motor torque (Step 23) and outputs it as a motor torque command (Step 24). In response to the command, the first MG 2 is operated as a motor.

Now, an example of driving force control in Step 23 will be described hereinafter.

During acceleration running, as the first MG 2 is operated as a motor, the rotational driving force of the first MG 2 is added to the rotational driving force of the engine 101, increasing the driving force acting on the automobile 100. Therefore, acceleration performance is improved. However, it may be difficult to operate the first MG 2 as a motor constantly during acceleration running due to restrictions on the electric energy stored in the battery 6, restrictions on durability of the first inverter 4, etc. In such cases, it becomes necessary to operate the first MG 2 as a motor only under certain conditions. Alternatively, the rotational driving force of the first MG 2 must be adjusted according to the driving force demanded by the driver. The driving force control is control to satisfy the above conditions.

Figure 15:
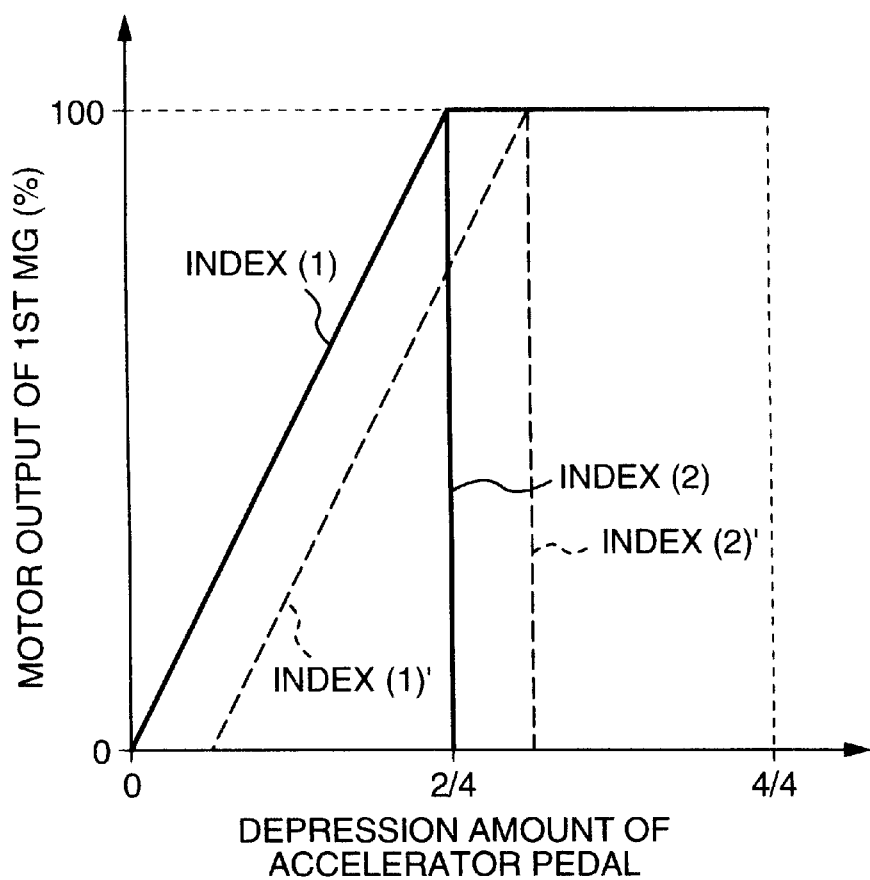
FIG. 15 is a view showing an example of driving force control based on operating condition control.

FIG. 15 is a view showing an example of driving force control. The horizontal axis represents the depression amount of the accelerator pedal 114 and the vertical axis represents the motor output of the first MG 2. Indices of the motor output from the first MG 2 corresponding to the depression amount of the accelerator pedal 114 are given as "index (1)", "index (2)", "index (1)'" and "index (2)'". If it is difficult to operate the first MG 2 as a motor constantly during acceleration running for the reasons described above, it is possible to generate driving force in accordance with the depression amount of the accelerator pedal 114, i.e., an acceleration request of the driver, by determining the motor output of the first MG 2, for example, on the basis of the indices. "Index (1)" is one which increases the motor output of the first MG 2 in proportion to the depression amount of the accelerator pedal 114, for example, until the depression amount of the accelerator pedal 114 reaches ⅔ (maximum value=4/4), and from then on, it maximizes the motor output of the first MG 2. "Index (2)" is one which produces zero motor output, for example, until the depression amount of the accelerator pedal 114 reaches ⅔, and from then on, it maximizes the motor output of the first MG 2. Incidentally, "Index (1)" and "Index (2)" may be shifted in the direction of increasing depression amount of the accelerator pedal 114 (to "Index (1)'" and "Index (2)'" in the drawing) according to the characteristics of the driver, specifically, the distribution and frequency of the depression amount of the accelerator pedal 114, and the indices may be used selectively as required. By determining the motor output of the first MG 2 on the basis of these indices, it is possible to achieve a balance between an amount of electric energy drawn from the battery 6 by the motoring operation of the first MG 2 and an amount of electric energy stored in the battery 6 by the generating operation (regeneration) of the first MG 2 while the automobile 100 goes through a start, acceleration running, constant-speed running, deceleration running, and a stop. Thus, the charging rate of the battery 6 can be kept within a predetermined prescribed range.

By using the driving force control described above, it is possible to operate the first MG 2 as a motor without being affected by the restrictions on the electric energy stored in the battery 6, restrictions on the durability of the first inverter 4, etc.

Now, an example of charging amount control in Step 23 will be described hereinafter.

As described above, in order not to lower the durability of the battery 6, it is necessary to keep the charging rate of the battery 6 within a prescribed range. The charging amount control is control to satisfy the above conditions.

If the charging rate of the battery 6 remains near the upper limit value of a predetermined prescribed range, it is desirable to operate the first MG 2 as a motor during acceleration running or constant-speed running to prevent the charging rate from exceeding the predetermined prescribed range by recovering the deceleration energy. Therefore, in such cases, an amount of energy recovered during deceleration running is estimated on the basis of vehicle speed, etc., and then on the basis of this estimate, an amount of electric energy that can be drawn from the battery 6 and a motor torque of the first MG 2 are determined. In this way, by estimating the recovery of deceleration energy and operating the first MG 2 as a motor so as to consume the electric energy stored in the battery 6 without causing the charging rate to fall outside a predetermined prescribed range, it is possible to keep the charging rate within a predetermined designated range. Besides, the fuel economy can be improved because the rotational driving force of the engine 101 can be reduced by the extent to which the first MG 2 is operated as a motor.

Step 25 will be described hereinafter.

During running, the engine control means determines the opening degree of the throttle (not shown) by referring to a diagram or the like (not shown) on the basis of information about the depression amount of the accelerator pedal 114, vehicle speed, rotational speed of the engine 101, etc., and outputs it as a command to the throttle. In response to the command, the throttle performs a valve opening/closing action, so that the engine 101 generates a predetermined rotational driving force.

In a case in which operating condition control is not effected, even though the driver adjusts the depression amount of the accelerator pedal 114 so as to keep the driving force constant, driving force in conformity with the driving force demanded by the driver cannot be obtained since when the rotational driving force of the first MG 2 is varied by the above-described charging amount control, this leads directly to variation of the driving force.

However, if operating condition control based on the operation mode 2A is effected, the operating condition control means 10 determines opening degree of the throttle necessary to generate driving force calculated by subtracting the driving force equivalent to the rotational driving force of the first MG 2 from the driving force demanded by the driver, on the basis of engine control, and issues a command of the determined opening degree to the engine control means 111 to output it to the throttle.

The use of the engine control described above makes it possible to generate the driving force which meets the driving force demanded by the driver as well as to improve the operability and comfortableness of the automobile 100.

Step 26 will be described hereinafter.

If, due to continuation of the deceleration running, the rotational speed of the engine 101 increases and the rotational speed of the first MG 2 connected to the engine 101 rises above the rotational speed which motor output is available or the charging rate of the battery 6 hovers near the lower limit value of a predetermined prescribed range, the first MG 2 can no longer be operated as a motor. If it becomes impossible to operate the first MG 2 as a motor for this reason, for example, and operation in accordance with the operation mode 2A is no longer applicable, the process goes to Step 20 to select another operation mode. If the operation mode 2A remains in effect, the process goes to Step 27.

Step 27 will be described hereinafter.

The operating condition control means 10 judges whether it is necessary to shift to another operation mode. If it is, the process goes to Step 20. If it is not necessary, the process goes to Step 21 and operating conditions control based on the operation mode 2A is continued.

Steps 21 to 27 above are the operating condition control and processes based on the operation mode 2A.

Figure 16:
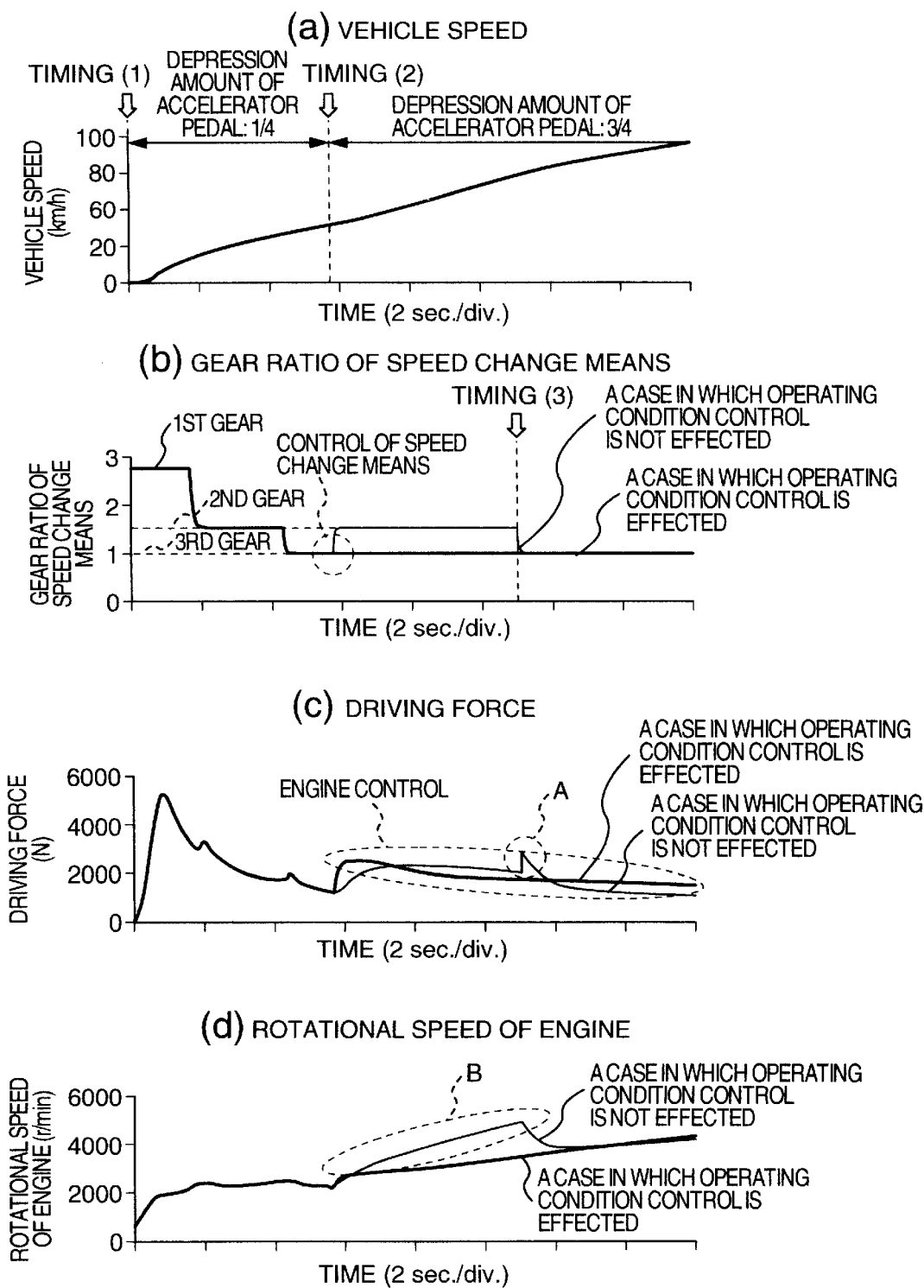
FIG. 16 is views showing time charts depicting vehicle speed, gear ratio of speed change means, driving force, and rotational speed of an engine.

Referring to FIG. 16, description will be given hereinafter about advantages of operating condition control based on the operation mode 2A is effected on the automobile 100 in which the first driving force transmitting means 102 is a torque converter and the speed change means 104 is a four-speed automatic transmission.

FIG. 16 shows various time charts which depict processes in which the automobile 100 starts and continues acceleration running. FIG. 16(a) is a time chart of vehicle speed, where timing (1) represents a timing for starting the automobile 100 with the accelerator pedal 114 depressed ¼ (maximum value= 4/4) and timing (2) represents a timing for changing the depression amount of the accelerator pedal 114 to ¾ for acceleration. FIG. 16(b), which is a time chart of the gear ratio of the speed change means 104, depicts a gear change from first gear (gear ratio= 2.8) in which the automobile 100 is stopped to third gear (gear ratio=1) for acceleration running. FIG. 16(c) is a time chart of driving force. FIG. 16(d) is a time chart of the rotational speed of the engine 101.

Now, description will be given hereinafter about details and advantages of various types of control performed in the operating condition control.

At timing (2), the depression amount of the accelerator pedal 114 increases from ¼ to ¾, thereby increasing the opening degree of the throttle (not shown). In a case in which the operating condition control is not effected, the speed change means 104 performs gear change of down-shift from third gear to second gear in response to a command from the control means 112 for the speed change means as shown in FIG. 16(b). However, if operating condition control is used, the speed change means 104 maintains third gear without performing gear change of down-shift from third gear to second gear ("speed change means control" in the drawing) on the basis of the speed change means control.

Since the speed change means control described above eliminates the gear change of up-shift from second gear to third gear which would be performed at timing (3) in the absence of operating condition control, the sharp change (portion A in the drawing) in the driving force which would be caused by the gear change of up-shift does not take place. Also, the sharp rise (portion B in the drawing) in the rotational speed of the engine 101 does not occur. With this, the comfortableness and the operability of the automobile 100 are improved and its fuel economy and discharge performance are improved.

After timing (1), the motor torque of the first MG 2 is determined on the basis of the driving force control. Between timing (1) and timing (2), the motor torque of the first MG 2 is zero. However, after timing (2), the driving force which meets the driving force demanded by the driver is generated by operating the first MG 2 as a motor.

That is, in the absence of operating condition control, gear change of down-shift is done at timing (2) to generate the driving force which meets the driving force demanded by the driver, so that the sharp rise (portion B in the drawing) in the rotational speed of the engine 101 occurs. Also, gear change of up-shift is done at timing (3), so that the sharp change (portion A in the drawing) in the driving force occurs. However, by operating the first MG 2 as a motor on the basis of operating condition control, it is possible to improve the comfortableness and operability of the automobile 100 as well as its fuel economy and discharge performance without problem that would otherwise be caused by the two gear changes described above.

An example of the advantage in a case in which the operating condition control base on the operation mode 2A is effected on the automobile 100 in which the first driving force transmitting means 102 is a torque converter and the speed change means 104 is a four-speed automatic transmission has been described above. As described above, however, the present invention can provide the same advantage in any of structures in combination of any of the above-mentioned first driving force transmitting means 102 and any of the above-mentioned speed change means 104.

Now, description will be given hereinafter about a case in which operation mode 2B is selected in Step 20, i.e., a case in which the operating state of the first MG 2 is free and the operating status of the second MG 3 is motoring.

Step 28 will be described hereinafter.

The operating condition control means 10 detects the ON/OFF state of the accelerator pedal 114, and when the accelerator pedal 114 becomes an ON state, the process goes to Step 22'. If the accelerator pedal 114 is in the OFF state, the process goes to Step 20, where select of operation mode is continued.

Step 22' will be described hereinafter.
Step 22' is similar to Step 22.
Steps 23' and 24' will be described hereinafter.
Step 23' is similar to Step 23.
Step 24' is similar to Step 24.
Step 25' will be described hereinafter.

In Step 25', which is similar to Step 25, the operating condition control means 10 determines opening degree of the throttle necessary to generate driving force calculated by subtracting the driving force equivalent to the rotational driving force of the first MG 2 from the driving force demanded the driver, on the basis of the engine control described above, and instructs the engine control means 111 to output it as a command to the throttle.

The use of the engine control described above makes it possible to generate the driving force which meets the driving force demanded the driver as well as to improve the operability and comfortableness of the automobile 100.

Step 29 will be described hereinafter.

If, due to continuation of the acceleration running, the rotational speed of the second wheel drive shaft 106 increases and the rotational speed of the second MG 3 connected to the second wheel drive shaft 106 via the second driving force transmitting means 103 rises above the rotational speed which motor output is available or the charging rate of the battery 6 hovers near the lower limit value of a predetermined prescribed range, the second MG 3 can no longer be operated as a motor. If it becomes impossible to operate the second MG 3 as a motor for this reason, for example, and operation in accordance with the operation mode 2B is no longer established, the process goes to Step 20 to select another operation mode. If operation in accordance with the operation mode 2B remains in effect, the process goes to Step 30.

Step 30 will be described hereinafter.

The operating condition control means 10 judges whether it is necessary to shift to another operation mode. If it is, the process goes to Step 20. If it is not necessary, the process goes to Step 28, where the operating condition control based on the operation mode 2B is continued.

Steps 28 to 30, Step 22', Step 23', Step 24', and Step 25' above are operating condition control and processes based on the operation mode 2B.

Now, description will be given hereinafter about a case in which operation mode 2C is selected in Step 20, i.e., a case in which the operating status of both first MG 2 and second MG 3 is motoring.

Step 31 will be described hereinafter.

The operating condition control means 10 detects the ON/OFF state of the accelerator pedal 114, and when the accelerator pedal 114 becomes an ON state, the process goes to Step 22'. If the accelerator pedal 114 is in the OFF state, the process goes to Step 20, where selection of operation mode is continued.

Step 22' will be described hereinafter.

Step 22' is similar to Step 22.

Steps 32 and 24' will be described hereinafter.

On the basis of motor torque distribution control as well as the driving force control and charging amount control described earlier, the operating condition control means 10 determines an appropriate motor torque (Step 32) and outputs it as a motor torque command (Step 24'). In response, the first MG 2 and second MG 3 are operated as motors.

Now, description will be given hereinafter about an example of motor torque distribution control in Step 32.

As the first MG 2 and the second MG 3 are operated as motors, their rotational driving forces are added to the rotational driving force of the engine 101, increasing the driving force acting on the automobile 100, and thus resulting in improved acceleration performance. However, since there is restriction on the electric energy stored in the battery 6, care should be taken to minimize an amount of electric energy drawn from the battery 6 when operating the first MG 2 and the second MG 3 as motors. Therefore, at the time of determining motor torque, it is necessary to take into consideration the motor efficiency of the first MG 2 and the second MG 3. The motor torque distribution control is control to satisfy the above conditions.

Figure 17:
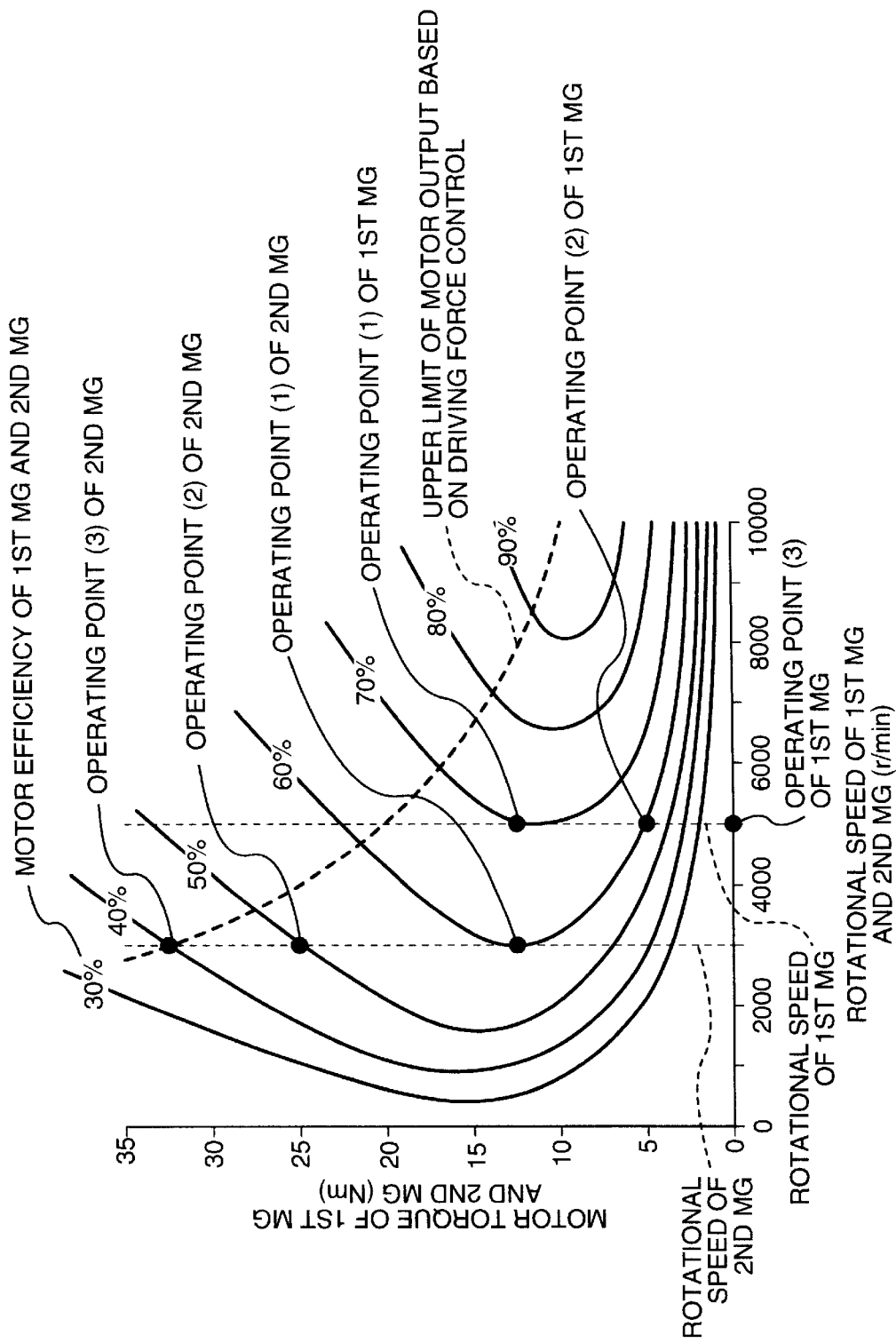
FIG. 17 is a view showing an example of motor torque distribution control based on operating condition control.

FIG. 17 is a view showing an example of motor torque distribution control. The horizontal axis represents the rotational speed of the first MG 2 and the second MG 3 and the vertical axis represents the motor torque of the first MG 2 and the second MG 3, and the figure shows iso-motor-efficiency lines at intervals of 10% between 30% and 90% when the first MG 2 and the second MG 3 have the same motor efficiency. These characteristics can be grasped beforehand as motor characteristics, and then motor torque distribution control is performed on the basis of them.

First, with reference to FIG. 17, description will be given hereinafter about an example of motor torque distribution control which minimizes sum of the motor inputs for the first MG 2 and the second MG 3 that have the motor efficiencies shown in FIG. 17.

FIG. 17 shows the rotational speeds of the first MG 2 and the second MG 3 (5000 r/min and 3000 r/min, respectively, in this case) at any vehicle speed during acceleration running or constant-speed running as well as an upper limit value of sum of motor outputs from the first MG 2 and the second MG 3 based on the driving force control (hereinafter referred as the upper limit value of motor output based on the driving force control). These values are not necessarily the same as those described above or shown in the drawing because they depend on the pulley ratio between the first MG 2 and engine 101, gear ratio of the speed change means 104, reduction gear ratio of the second driving force transmitting means 103, vehicle speed, etc.

If the rotational speeds of the first MG 2 and the second MG 3 are denoted by $N_{MG1M}$ and $N_{MG2M}$, respectively, their motor torques are denoted by $T_{MG1M}$ and $T_{MG2M}$ respectively, their motor efficiencies are denoted by $\eta_{MG1M}$ and $\eta_{MG2M}$, respectively, and the upper limit value of motor output based on the driving force control is denoted by $W_{LIMITM}$, valid $T_{MG1M}$ and $T_{MG2M}$ values which can be set in this case should satisfy $(((N_{MG1M} \times 2 \times \pi/60) \times T_{MG1M}) + ((N_{MG2M} \times 2 \times \pi/60) \times T_{MG2M}) = W_{LIMITM}$ (hereinafter referred as motor torque determination criterion) and there are countless in number.

However, if operating condition control based on the operation mode 2C is effected, the operating condition control means sets the operating points of the first MG 2 and the second MG 3 at "operating point (1) of the first MG" and "operating point (1) of the second MG" in the drawing so as to minimize an amount of electric energy drawn from the battery 6, i.e., a sum of the motor inputs for the first MG 2 and the second MG 3 (hereinafter referred as the sum of motor inputs), namely $(((N_{MG1M} \times 2 \times \pi/60) \times T_{MG1M}/\eta_{MG1M}) + ((N_{MG2M} \times 2 \times \pi/60) \times T_{MG2M}/\eta_{MG2M})$, based on motor torque distribution control, and then determines motor torque on the basis of the operating points determined. This minimizes the sum of motor inputs and satisfies motor torque determination criterion at the same time. For example, the sum of motor inputs is decreased by approximately 20% in comparison with the time when the first MG 2 and the second MG 3 are operated as motors at "operating point (2) of the first MG" and "operating point (2) of the second MG" in the drawing.

Next, with reference to FIG. 17, description will be given hereinafter about an example of motor torque distribution control intended to maximize an amount of electric energy drawn from the battery 6 for the purpose of keeping the charging rate of the battery 6 within a prescribed range.

In this case, on the basis of the motor torque distribution control, the operating condition control means sets the operating points of the first MG 2 and the second MG 3 at "operating point (3) of the first MG" and "operating point (3) of the second MG" in the drawing so as to maximize the sum of the motor inputs for the first MG 2 and the second MG 3 in a range satisfying the motor torque determination criterion, and then determines motor torque on the basis of the operating points determined. With this the sum of motor outputs is maximized and the motor torque determination criterion is satisfied at the same time. For example, the sum of motor inputs is increased 65% in comparison with when the first MG 2 and the second MG 3 are operated as motors at "operating point (1) of the first MG" and "operating point (1) of the second MG" in the drawing.

By using the motor torque distribution control described above, it is possible to minimize the sum of motor inputs for the first MG 2 and the second MG 3 and minimize the amount of electric energy drawn from the battery 6. Further, it is possible to keep the charging rate of the battery 6 within a predetermined prescribed range.

Further, in general, the motor efficiencies of the first MG 2 and the second MG 3 tend to increase with rotational speed thereof. Thus, to decrease the motor inputs, it is desirable to operate the first MG 2 and the second MG 3 as motors at high rotational speed. In this respect, the auxiliary drive 1 according to the embodiment of the present invention, which can operate the first MG 2 as a motor at high rotational speed corresponding to the pulley ratio between the first engine 101 and the MG 2 (which is defined as "rotational speed of the first MG 2/rotational speed of the engine 101" and takes a value larger than 1), is superior to a structure (pulley ratio=1) in which the first MG 2 is disposed, for example, between the engine 101 and first driving force transmitting means 102.

Step 25' will be described hereinafter.

Step 25' is similar to Step 25.

Step 33 will be described hereinafter.

If either the first MG 2 or the second MG 3 cannot be operated as a motor and consequently operation in accordance with the operation mode 2C is no longer established, the process goes to Step 20 to select another operation mode. If operation in accordance with the operation mode 2C remains in effect, the process goes to Step 34.

Step 34 will be described hereinafter.

The operating condition control means 10 judges whether it is necessary to shift to another operation mode. If it is, the process goes to Step 20. If it is not necessary, the process goes to Step 31, where the control operating conditions control based on the operation mode 2C is continued.

Steps 31 to 34, Step 22', Step 24', and Step 25' above are the operating condition control and processes based on the operation mode 2C.

Now, description will be given hereinafter about a case in which operation mode 2D is selected in Step 20, i.e., a case in which the operating state of the first MG 2 is generation and the operating status of the second MG 3 is free.

Cases in which operation mode 2D is selected comprise (1) when it is necessary to raise the charging rate of the battery 6 by operating the first MG 2 as a generator because the charging rate of the battery 6 remains near the lower limit value of a predetermined prescribed range (hereinafter referred as case (1)) or (2) when it is necessary to reduce the rotational speed of the engine 101 by operating the first MG 2 as a generator such that the front wheels 107a and 107b produce stable driving force with respect to a low coefficient of friction road surface (hereinafter referred as case (2)).

Step 35 will be described hereinafter.

The operating condition control means 10 detects the ON/OFF state of the accelerator pedal 114, and when the accelerator pedal 114 becomes an ON state, the process goes to Step 36. If the accelerator pedal 114 is in the OFF state, the process goes to Step 20, where selection of operation mode is continued.

Step 36 will be described hereinafter.

Based on the speed change means control, the operating condition control means 10 issue a command to the control means 112 for the speed change means to output up-shift and down-shift instructions suitable for operation mode 2D to the speed change means 104. In case (1), for example, an appropriate gear ratio is determined such that the engine 101 operates in a region around the best fuel economy while the first MG 2 operates in a high-efficiency region.

Steps 37 and 38 will be described hereinafter.

The operating condition control means 10 determines motor torque of the first MG 2, for example, suitable for the case (1) and the case (2) (Step 37) and outputs it as a generator torque instruction (Step 38). In response to this instruction, the first MG 2 is operated as a generator.

Step 39 will be described hereinafter.

The operating condition control means 10 determines opening degree of the throttle necessary to generate driving force calculated by adding braking force equivalent to negative rotational driving force of the first MG 2 to the driving force demanded the driver, on the basis of engine control means control, and instructs the engine control means 111 to output it as an instruction to the throttle.

Step 40 will be described hereinafter.

If the charging rate of the battery 6 starts to hover near the upper limit value of a predetermined prescribed range, it becomes unnecessary to operate the first MG 2 as a generator. If operation in accordance with the operation mode 2D is no longer established for this reason, for example, the process goes to Step 20 to select another operation mode. If operation in accordance with the operation mode 2D remains in effect, the process goes to Step 41.

Step 41 will be described hereinafter.

The operating condition control means 10 judges whether it is necessary to shift to another operation mode. If it is, the process goes to Step 20. If it is not necessary, the process goes to Step 35, where the operating condition control based on the operation mode 2D is continued.

Steps 35 to 41 above are the operating condition control and processes based on the operation mode 2D.

Now, description will be given hereinafter about a case in which operation mode 2E is selected in Step 20, i.e., a case in which the operating state of the first MG 2 is generation and the operating status of the second MG 3 is motoring.

In addition, a case in which operation mode 2E is selected comprises mainly when it is necessary to reduce the rotational speed of the engine 101 by operating the first MG 2 as a generator such that the front wheels 107a and 107b produce stable driving force with respect to a low coefficient of friction road surface as well as to control the slip rate by operating the second MG 3 as a motor such that the maximum driving force is generated between the rear wheels 108a and 108b and road surface (hereinafter referred as case (3)).

Step 42 will be described hereinafter.

The operating condition control means 10 detects the ON/OFF state of the accelerator pedal 114, and when the accelerator pedal 114 becomes an ON state, the process goes to Step 43. If the accelerator pedal 114 is in the OFF state, the process goes to Step 20, where selection of operation mode is continued.

Step 43 will be described hereinafter.

Based on speed change means control, the operating condition control means 10 issues a command to the control means 112 for the speed change means to output up-shift and down-shift instructions suitable for operation mode 2E to the speed change means 104. In case (3), for example, an appropriate gear ratio is determined such that the engine 101 operates in a region around the best fuel economy while the first MG 2 operates in a high-efficiency region.

Steps 44 and 45 will be described hereinafter.

The operating condition control means 10 determines the generator torque of the first MG 2 and the motor torque of the second MG 2, for example, suitable for case (3) (Step 44) and outputs them as a drive torque command (Step 45). In response to this command, the first MG 2 is operated as a generator and the second MG 3 is operated as a motor.

Step 46 will be described hereinafter.

The operating condition control means 10 determines opening degree of the throttle necessary to generate driving force calculated by adding braking force equivalent to negative rotational driving force of the first MG 2 and subtracting driving force equivalent to rotational driving force of the second MG 3 to/from the driving force demanded by the driver, on the basis of engine control means control, and instructs the engine control means 111 to output it as an instruction to the throttle.

Step 47 will be described hereinafter.

If the charging rate of the battery 6 starts to hover near the upper limit value of a predetermined prescribed range, it becomes unnecessary to operate the first MG 2 as a generator. If operation in accordance with the operation mode 2E is no longer established for this reason, for example, the process goes to Step 20 to select another operation mode. If operation in accordance with the operation mode 2E remains in effect, the process goes to Step 48.

Step 48 will be described hereinafter.

The operating condition control means 10 judges whether it is necessary to shift to another operation mode. If it is, the process goes to Step 20. If it is not necessary, the process goes to Step 42, where the operating condition control based on the operation mode 2E is continued.

Steps 42 to 48 above are the operating condition control and processes based on the operation mode 2E.

The above are the auxiliary drive 1 and automobile 100 equipped with the same according to an embodiment of the present invention.

Incidentally, it is also possible to operate the first MG 2 only as a generator, and not as a motor. In that case, the first MG 2 may be a generator such as an alternator, for example.

As described above, according to the present invention, it is possible to efficiently recover the automobile's kinetic energy resulting from deceleration, i.e., deceleration energy, and use the recovered deceleration energy as an energy source for operating a rotating electric machine as a motor, and thereby improve the operability, comfortableness, safety, and even fuel economy of the automobile.

What is claimed is:

1. An auxiliary drive comprising:
    a rotating electric machine connected to an engine and functioning at least as a generator;
    speed change means disposed between the engine and a wheel axle;
    demanded braking force detection means for detecting braking force demanded by a driver;
    engine braking force calculation means for calculating engine braking force; and
    regenerative braking force calculation means for calculating regenerative braking force produced by regenerative power generation of the rotating electric machine, wherein
    gear ratio or shift point of the speed change means is controlled on the basis of information from the demanded braking force detection means, the engine braking force calculation means and the regenerative braking force calculation means.

2. An auxiliary drive comprising:
    a rotating electric machine connected to an engine and functioning at least as a generator;
    speed change means disposed between the engine and a wheel axle;
    demanded braking force detection means for detecting braking force demanded by a driver;
    engine braking force calculation means for calculating engine braking force; and
    regenerative braking force calculation means for calculating regenerative braking force produced by regenerative power generation of the rotating electric machine, wherein
    gear ratio of speed change means is maximized in a range in which sum of the regenerative braking force and the engine braking force does not exceed a predetermined value or the braking force demanded by the driver.

3. An auxiliary drive comprising:
    a rotating electric machine connected to an engine and functioning at least as a generator;
    speed change means disposed between the engine and a wheel axle;
    demanded braking force detection means for detecting braking force demanded by a driver;
    engine braking force calculation means for calculating engine braking force; and
    regenerative braking force calculation means for calculating regenerative braking force produced by regenerative power generation of the rotating electric machine, wherein
    during coast running, gear ratio or shift point of the speed change means is controlled so that rotational speed of the engine becomes maximum in a range in which the engine braking force does not exceed a predetermined value and the rotational speed of the engine does not become over-speed.

4. An auxiliary drive comprising:
    a rotating electric machine connected to an engine and functioning at least as a generator;
    speed change means disposed between the engine and a wheel axle;
    demanded braking force detection means for detecting braking force demanded by a driver;
    engine braking force calculation means for calculating engine braking force; and
    regenerative braking force calculation means for calculating regenerative braking force produced by regenerative power generation of the rotating electric machine, wherein
    during regenerative operation of the rotating electric machine, gear ratio or shift point of the speed change means is controlled so that an amount of regenerative power generation becomes maximum in a range in which sum of the regenerative braking force and the engine braking force does not exceed a predetermined value or the braking force demanded by the driver.

5. The auxiliary drive according to claim 3, wherein the control of the gear ratio of said speed change means comprises control to avoid at least up-shift just after a shift into coast running.

6. The auxiliary drive according to claim 4, wherein the control of the gear ratio of said speed change means comprises control to carry out down-shift when an amount of regenerative power generation before the down-shift exceeds an amount of regenerative power generation after the down-shift.

7. The auxiliary drive according to any one of claims 1 to 6, further comprising a torque converter with lock-up function disposed between the engine and the speed change means.

8. An automobile comprising:
    an engine;
    wheels driven by the engine;
    a rotating electric machine connected to the engine and functioning at least as a generator;
    speed change means disposed between the engine and a wheel axle;
    demanded braking force detection means for detecting braking force demanded by a driver;
    engine braking force calculation means for calculating engine braking force; and
    regenerative braking force calculation means for calculating regenerative braking force produced by regenerative power generation of the rotating electric machine, wherein
    gear ratio or shift point of the speed change means is controlled on the basis of information from the demanded braking force detection means, the engine braking force calculation means and the regenerative braking force calculation means.

9. An automobile comprising:

an engine;

wheels driven by the engine;

a rotating electric machine connected to the engine and functioning at least as a generator;

speed change means disposed between the engine and a wheel axle;

demanded braking force detection means for detecting braking force demanded by a driver;

engine braking force calculation means for calculating engine braking force; and regenerative braking force calculation means for calculating regenerative braking force produced by regenerative power generation of the rotating electric machine, wherein gear ratio of speed change means is maximized in a range in which sum of the regenerative braking force and the engine braking force does not exceed a predetermined value or the braking force demanded by the driver.

10. An automobile comprising:

an engine;

wheels driven by the engine;

a rotating electric machine connected to the engine and functioning at least as a generator;

speed change means disposed between the engine and a wheel axle;

demanded braking force detection means for detecting braking force demanded by a driver;

engine braking force calculation means for calculating engine braking force; and regenerative braking force calculation means for calculating regenerative braking force produced by regenerative power generation of the rotating electric machine, wherein during coast running, gear ratio or shift point of the speed change means is controlled so that rotational speed of the engine becomes maximum in a range in which the engine braking force does not exceed a predetermined value and the rotational speed of the engine does not become over-speed.

11. An automobile comprising:

an engine;

wheels driven by the engine;

a rotating electric machine connected to the engine and functioning at least as a generator;

speed change means disposed between the engine and a wheel axle;

demanded braking force detection means for detecting braking force demanded by a driver;

engine braking force calculation means for calculating engine braking force; and regenerative braking force calculation means for calculating regenerative braking force produced by regenerative power generation of the rotating electric machine, wherein during regenerative operation of the rotating electric machine, gear ratio or shift point of the speed change means is controlled so that an amount of regenerative power generation becomes maximum in a range in which sum of the regenerative braking force and the engine braking force does not exceed a predetermined value or the braking force demanded by the driver.

* * * * *